(12) United States Patent
Sun et al.

(10) Patent No.: US 9,040,158 B2
(45) Date of Patent: May 26, 2015

(54) GENERIC APPROACH FOR SYNTHESIZING ASYMMETRIC NANOPARTICLES AND NANOASSEMBLIES

(71) Applicant: UChicago Argonne, LLC, Chicago, IL (US)

(72) Inventors: Yugang Sun, Naperville, IL (US); Yongxing Hu, Willowbrook, IL (US)

(73) Assignee: UChicago Argonne LLC, Chicago, IL (US)

( * ) Notice: Subject to any disclaimer, the term of this patent is extended or adjusted under 35 U.S.C. 154(b) by 141 days.

(21) Appl. No.: 13/621,992

(22) Filed: Sep. 18, 2012

(65) Prior Publication Data

US 2014/0077121 A1    Mar. 20, 2014

(51) Int. Cl.
| | | |
|---|---|---|
| *H01F 1/00* | (2006.01) | |
| *H01F 1/01* | (2006.01) | |
| *B05D 5/12* | (2006.01) | |
| *B82Y 30/00* | (2011.01) | |
| *B82Y 40/00* | (2011.01) | |

(52) U.S. Cl.
CPC .............. *H01F 1/0054* (2013.01); *B82Y 30/00* (2013.01); *B82Y 40/00* (2013.01); *Y10S 977/773* (2013.01); *Y10S 977/89* (2013.01); *Y10S 977/81* (2013.01)

(58) Field of Classification Search
USPC ................ 428/403; 427/212, 127; 252/62.55; 977/773, 810, 890
IPC ........ H01F 1/00,1/01; B05D 5/12; B82Y 40/00, B82Y 30/00
See application file for complete search history.

(56) References Cited

U.S. PATENT DOCUMENTS

| | | | | |
|---|---|---|---|---|
| 7,288,134 | B2 * | 10/2007 | Sun et al. .......................... | 75/348 |
| 7,585,349 | B2 * | 9/2009 | Xia et al. .......................... | 75/371 |
| 7,766,993 | B2 * | 8/2010 | Sun et al. .......................... | 75/332 |
| 8,045,152 | B2 * | 10/2011 | Halas et al. ................... | 356/301 |
| 8,632,884 | B2 * | 1/2014 | Ying et al. .................... | 428/403 |

* cited by examiner

*Primary Examiner* — Leszek Kiliman
(74) *Attorney, Agent, or Firm* — Foley & Larnder LLP

(57) ABSTRACT

A generic route for synthesis of asymmetric nanostructures. This approach utilizes submicron magnetic particles ($Fe_3O_4$—$SiO_2$) as recyclable solid substrates for the assembly of asymmetric nanostructures and purification of the final product. Importantly, an additional $SiO_2$ layer is employed as a mediation layer to allow for selective modification of target nanoparticles. The partially patched nanoparticles are used as building blocks for different kinds of complex asymmetric nanostructures that cannot be fabricated by conventional approaches. The potential applications such as ultra-sensitive substrates for surface enhanced Raman scattering (SERS) have been included.

20 Claims, 32 Drawing Sheets

Control over the size of the hollow domains in the asymmetric Au nanostructures smaller → larger Asymmetric Au-Pt and Au-Pd solid-hollow nanostructures Asymmetric Au solid-hollow nanostructures with double nanoshells Galvanic Replacement for complicated asymmetric nanostructures

GENERIC APPROACH FOR SYNTHESIZING ASYMMETRIC NANOPARTICLES AND NANOASSEMBLIES

STATEMENT OF GOVERNMENT INTEREST

The United States Government has rights in the invention described herein pursuant to Contract No. DE-AC02-06CH11357 between the United States Department of Energy and UChicago Argonne, LLC, as operator of Argonne National Laboratory.

FIELD OF THE INVENTION

The present invention generally relates a generic approach for the preparation of asymmetric nanoparticles and nanoassemblies in terms of morphologies, compositions, surface chemistries, and functionalities. More specifically, the present invention relates to the utilization of recyclable magnetic colloidal particles as unique nano-reactors for the scalable synthesis of asymmetric nanoparticles and nanoassemblies based on a selective physical confinement. The potential applications of the asymmetric nanostructures such as surface-enhanced Raman scattering (SERS) are also included in this invention.

BACKGROUND OF THE INVENTION

Controlled assembly of nanoparticles into dimers and complex nanoclusters with asymmetric configurations (in terms of geometries and compositions) is of great interest because of their novel properties and possible promising applications (e.g., biosensing, labeling, display, catalysis, etc.). For example, dimers made of either uniform Ag nanoparticles or Au nanoparticles have been demonstrated to be a class of promising surface-enhanced Raman scattering (SERS) substrates due to the creation of hot spots between individual nanoparticles in each dimer. In these dimers made of equivalent particles (also called homodimers), electromagnetic coupling between the surface plasmon resonances (SPRs) of the individual nanoparticles results in the enhancement of the optically allowed in-phase mode, while the out-of-phase mode is dark due to the cancellation of the equivalent dipole moments. In contrast, the dimers made of non-equivalent nanoparticles (e.g., Ag/Au nanoparticle heterodimers) enables the observation of both in-phase and out-of-phase modes. In addition to optically active nanoparticles made of noble metals, various nanoparticles can be integrated through controlled assembly to form hybrid nanoclusters with multiple functionalities. Near-field coupling between different components in the nanoclusters may also lead to new properties that do not exist in individual nanoparticles.

Some progress has been made in controlling assembly of colloidal nanoparticles into specific clusters. One route is that dimers and clusters can be fabricated by spontaneous aggregation of nanoparticles when tuning the stabilities of colloidal nanoparticles. For instance, citrate-stabilized Au nanoparticles can form aggregated clusters upon addition of HCl to the nanoparticle dispersions to reduce stability of the Au nanoparticles. Amphiphilic nanoparticles capped with both hydrophilic and hydrophobic polymers can also be driven to assemble into dimers by tuning the hydrophobicity of solvents. Due to the absence of specific chemical bonding between the individual nanoparticles in the aggregated clusters, additional encapsulation process with amorphous shells (e.g., $SiO_2$, polymer) is usually necessary to fix the clusters. An alternative approach of for assembled clusters with increased stability relies on the modification of the nanoparticle surfaces with linker molecules that can bind nanoparticles together. In the pioneering work demonstrated by Alivisatos and Mirkin, DNA-modified Au nanoparticles can assemble into dimers, trimmers, and larger structures through the specific hybridization of the complementary single-stranded DNA molecules. Novak and Feldheim have also assembled Au nanoparticles into clusters of dimers, trimmers and tetramers with the use of rigid thiol-functionalized phenylacetylenes as molecular links and templates. Apparently it is difficult to synthesize specific clusters with high yield through this approach: the complete coverage of linker molecules on the surfaces of Au nanoparticles passivates the nanoparticle surfaces due to the strong bonding (usually S—Au covalent bonds) between the linker molecules and the Au surfaces. Such surface passivation leads to the hindrance to deposit other functional molecules on the Au nanoparticles for further applications.

To overcome the limitations, an attractive strategy is developed to selectively decorate the partial surface of a source nanoparticle with synthetic organic or biological molecules to form "binding patches" that can specifically bond with other nanoparticles. The remaining unmodified surface of the source nanoparticle is still active for deposition of interesting species. In order to creating the asymmetric chemistries on the surface of a source nanoparticle, the surface of the nanoparticle has to be partially hidden when it is exposed to linker molecules. One straightforward approach is to deposit nanoparticles on a solid substrate. The physical contacts between the nanoparticles and the substrate prevent the graft of linker molecules on the contact surfaces, leading to formation of "binding patches" only on the regions that exposed. Re-disperse the patched nanoparticles in appropriate solvents and mix with other nanoparticles may facilitate the assembly of them into dimers and high-level clusters with improved yield and purity. However, the ratio of different surface patches in nanoscale is difficult to tune by a cost-effective manner and scalability of this method is limited by the sizes of the solid substrates.

SUMMARY OF THE INVENTION

One embodiment of the invention relates to a method of making asymmetric nanostructures with the use of a colloidal magnetic particle as a reactor. A superparamagnetic core if provided. The magnetic core is coated with a shell layer. A plurality of a first component are associated with the coated magnetic core. A mediation layer is added, the thickness of the meditation layer being less than the diameter of at least a subset the plurality of first component, each first component in the subset having an exposed portion outside of the mediation layer. Each exposed portion is modified. The shell layer and mediation layer are removed. The nanostructures are formed comprising the first component and the second component.

In one embodiment, the present invention relates to a composition of matter. The composition of matter includes a core and a mediation layer coating the core. A plurality of seeds are associated with the core and substantially evenly dispersed about the core, partially embedded in the mediation layer.

In one embodiment, the present invention relates to a method of synthesizing nanostructures. A first $SiO_2$ layer is deposited on a core particle. A first component is attached to the first $SiO_2$ layer. A second $SiO_2$ layer is deposited on the first $SiO_2$ layer, the second $SiO_2$ layer having a thickness less than the diameter of the first component and the first component partially embedded in the second $SiO_2$ layer. A second component is attached to the first component. The nanostructures comprise the first component and the second component.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3(a) illustrates the typical low-magnification TEM image of the Au dimers that are highlighted by the red ellipses. The enlarged TEM image of a single dimer in FIG. 3(b) highlights that the dimers are coated with silicates originated from the dissolution of the $SiO_2$ layers. The silicates can be completely removed through a thorough wash with water, leading to the collection of clean dimers shown in FIG. 3(d). FIG. 3(c) gives a representative statistical analysis by the histogram, revealing a morphological yield of ~54% dimers, ~36% single particles and about 10% of nanostructures with three or more Au particles.

FIGS. 4a-b illustrate representative TEM images of asymmetric heterodimers made of (a) Au nanoparticles with different diameters (i.e., 15 nm and 30 nm) and (b) Au nanoparticles with different morphologies (i.e., spheres and rods).

FIG. 5(a) is a representative TEM image of the Au—Ag dimers highlighted with the red ellipses. The inset highlights an individual Au—Ag dimer and the scale bar is 15 nm. FIG. 5(b) shows the corresponding energy-dispersive x-ray scattering spectroscopy (EDS) curve of individual Au—Ag dimer, clearly displaying the appearance of both characteristic peaks of Au and Ag. FIG. 5(c) compares the UV-vis-NIR spectra of the Au—Ag dimers, the Au nanoparticles, and the Ag nanoparticles.

FIG. 8a shows amphiphilic asymmetric nanostructures assembled from hydrophilic Au nanoparticles (~15 nm) and hydrophobic Au nanoparticles with smaller sizes. FIG. 8b shows amphiphilic asymmetric nanostructures assembled from hydrophilic Au nanoparticles (~15 nm) and hydrophobic Fe—$Fe_3O_4$ core-shell nanoparticles. FIGS. 8c and 8d are digital photos of amphiphilic Au—$Fe_3O_4$ asymmetric nanoassemblies in a mixture solvent of hexane and water. FIG. 8c shows that the amphiphilic nanostructures are not well-dispersed in either hexane or water right after vortex; FIG. 8d indicates that the amphiphilic nanostructures are stabilized at the interface of hexane/water without disturbing.

FIG. 15a, 4 nm; FIG. 15c, 11 nm; and FIG. 15e, 17 nm; SEM images in FIGS. 15b, 15d, and 15f represent the MRMGPs formed from seeded plating of composite particles shown in FIGS. 15a, 15c, and 15e, respectively. Inset scale bars are 10 nm for the left column and 100 nm for the right column. The left column insets illustrate how the Au seeds are embedded in the $SiO_2$ matrix.

FIG. 17a is a set of SERS spectra of R6G solutions with different concentrations (corrected by subtracting the PVP background signals) measured with the use of MRMGPs (of FIG. 12e) in a magnetic field. FIG. 17b is a graph plotting the peak intensity at 1360 $cm^{-1}$ as a function of the concentrations of R6G.

FIG. 24a illustrates images of asymmetric Au nanoparticles with both solid and hollow domains that are formed through the galvanic replacement with different amounts of $HAuCl_4$. FIG. 24b shows the corresponding UV-vis-NIR spectra of the nanoparticles in FIG. 24a.

DETAILED DESCRIPTION OF THE PREFERRED EMBODIMENTS

Figure 1:
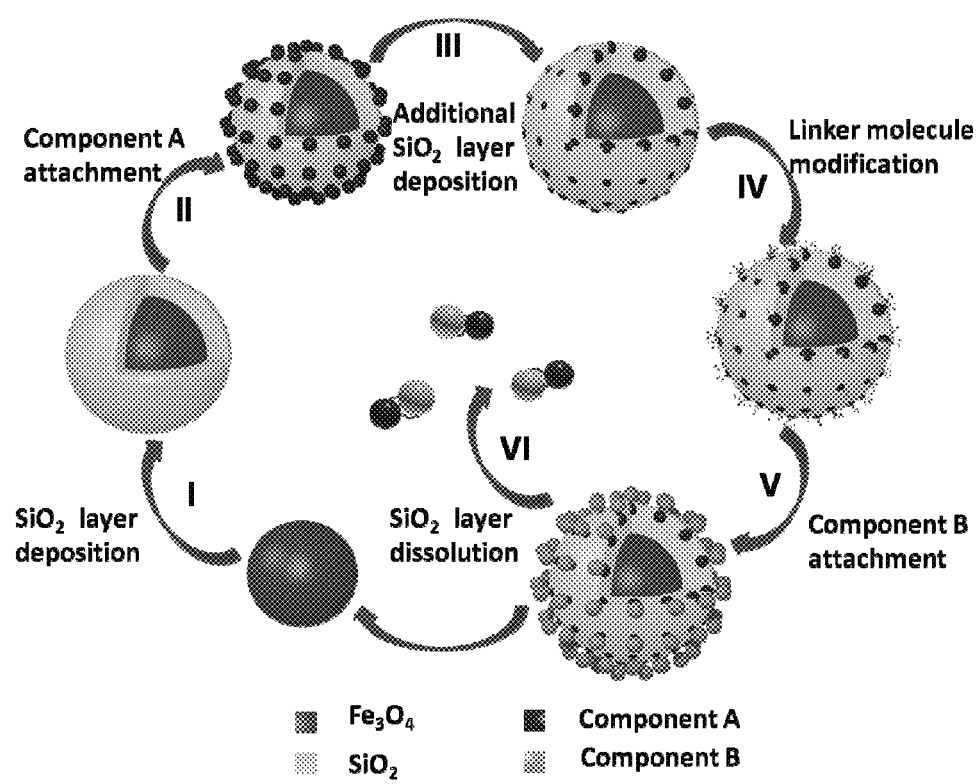
FIG. 1 is an illustration of the major steps in one embodiment of methods of the present invention for synthesis of asymmetric nanoparticles and nanoassemblies by taking the asymmetric dimers as an example: component A nanoparticles (A-nanoparticles) are first anchored on the surface of $Fe_3O_4$—$SiO_2$ core-shell colloidal substrates followed by a physical confinement through deposition of an additional $SiO_2$ layer (so-called the second $SiO_2$ layer in the following content), leaving surfaces of the A-nanoparticles with designed ratios to expose to the surround solution environment. Selective surface modification is then processed to deposit chemical linker molecules on the exposed surfaces of the A-nanoparticles. The A-nanoparticles now exhibit asymmetric surface chemistries. Mixing the modified composite particles with component B nanoparticles (B-nanoparticles) leads to the assembly of B-nanoparticles onto the A-nanoparticles through the formation of specific bonding between the linker molecules and the B-nanoparticles. Selectively dissolving the $SiO_2$ layer facilitates the collection of freestanding dimers. If A-nanoparticles and B-nanoparticles are same, homodimers can be obtained. Otherwise heterodimers can be synthesized if A-nanoparticles and B-nanoparticles are different in terms of composition, size, and morphology. The leftover superparamagnetic $Fe_3O_4$ cores can be recycled for the next synthesis.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A proposed generic technique for fabricating asymmetric nanostructures, which may include but is not limited to nanoparticles, nanoassemblies, and the like, is based on the use of colloidal magnetic core/shell particles (e.g., $Fe_3O_4/SiO_2$) as the sub-micron "solid substrates" to assist the asymmetric modification of nanoparticle surfaces together with a controlled physical confinement. For certain embodiments, the key feature is that the nanoparticles deposited on the core/shell particles can be partially embedded in a shell matrix (mediation layer)(e.g., $SiO_2$) by growing an additional shell layer ($SiO_2$) on the core/shell particles. The thickness of the shell layer (e.g., $SiO_2$) can be tuned at nanometer scale, indicating the ratio of different surface patches on the nanoparticles can be precisely tuned. It allows for the capability to precisely control the surfaces of the nanoparticles that can be exposed to linker molecules. Importantly, the core/shell particles with sub-micrometer dimensions exhibit much larger surface areas for modification of nanoparticles in comparison with the conventional solid substrates. In addition, the core/shell particles can well disperse in appropriate solvent to be compatible with the scalable solution-phase synthesis. This technique with the controllability at the nanometer precision provides an opportunity to fabricate with the needs which afford advancement of complex nanostructures, and serves as a tool to construct designed asymmetric nanoassemblies in a rational and controllable manner.

Certain embodiments of the invention relate to a generic approach for the synthesis of asymmetric nanoparticles and nanoassemblies in terms of compositions, shapes, sizes, and functionalities with the use of a superparamagnetic core. In one embodiment, a magnetic $Fe_3O_4$—$SiO_2$ core-shell colloidal particles is used as a unique reaction platform. In this approach selected nanoparticles are partially embedded in a $SiO_2$ matrix by selectively depositing a $SiO_2$ layer with controlled thickness on the magnetic colloidal particles. In one embodiment, amorphous $SiO_2$ with designed thickness is used as the mediation layer to strongly bond magnetic $Fe_3O_4$ cores and individual nanoparticles. For certain embodiments, the additional $SiO_2$ layer is crucial in the designed process because this secondary thin layer of $SiO_2$ can facilitate the selective modification of these partially embedded nanoparticles.

In the illustrated embodiments, the superparamagnetic core comprises $Fe_3O_4$, though it should be appreciated that other particles that exhibit superparamagnetism such as magnetic ferrite $MFe_2O_4$ (M=Co, Ni, Mn) nanoparticles, and metallic nanoparticles made of Fe, Co, CoFe may be utilized. Ideally, the core size can be from tens of nanometer to micro meters. In the illustrated embodiments the shell comprises $SiO_2$, though it should be appreciated that alternative layers capable of binding to the selected superparamagnetic core and forming a mediation layer may be utilized. In addition, although the use of tetraethyl orthosilicate (TEOS) for the formation of the $SiO_2$ layer is described, there are many substitutions, such as but not limited to tetramethyl orthosilicate (TMOS), tetrapropyl orthosilicate (TPOS), tetrabutyl orthosilicate (TBOS) that can be utilized to provide a silicate source and hydrolyze into $SiO_2$. The seed utilized in the illustrated examples is gold, but it should be appreciated that other nanoparticles that can associate with the core/shell particle can be utilized, including, but not limited to metals (e.g., Ag, Pt, Pd), oxides (e.g., TiO2), semiconductors (e.g., CdSe, CdS), halides (e.g., $NaYF_4$), et al. In the examples provided herein, the surface treatment of the core/shell is to provide amino groups on the shell to enable bonding of the seed (Au). Different molecules can be used as the linker molecules according to the composition of particles, which are not limited to those with amino groups. The type of surface treatment should be selected to enable the selected seeds to bind with the selected shells. In one embodiment, the seeds are buried between 0%-99% within the shells, preferably greater than 50%.

One embodiment of an assembly scheme is illustrated in FIG. 1. The scheme shown in FIG. 1 can be used to form "binding patches" on Au nanoparticles followed by assembling them into dimers. The approach starts with synthesis of superparamagnetic $Fe_3O_4$ colloidal particles through a high temperature hydrolysis and reduction of $FeCl_3$ in diethylene glycol as reported elsewhere. e.g., Ge, J.; Hu, Y.; Biasini, M.; Beyermann, W. P.; Yin, Y. Angew. Chem. Int. Ed. 2007, 46, 4342-4345 added here as reference. The $Fe_3O_4$ particles are then coated with an amorphous $SiO_2$ layer through a modified Stöber reaction that involves the hydrolysis of tetraethylorthosilicate (TEOS) (step I).

The resulting $Fe_3O_4/SiO_2$ core/shell particles are then modified with 3-aminopropyl-triethoxysilane (APTS) in an isopropanol solution to render the particle surfaces with amino groups (—$NH_2$). Mixing the modified core/shell particles with a dispersion of citrate-stabilized Au nanoparticles leads to the adsorption of Au nanoparticles on the surfaces of $Fe_3O_4/SiO_2$ core/shell particles due to the strong chemical bonding between Au atoms and N atoms in the amino groups (step II). Placing the dispersion in a magnetic field can easily separate the composite particles and excessive free Au nanoparticles.

Due to the significant difference in surface chemistry between Au and $SiO_2$, an additional $SiO_2$ layer (i.e., the second $SiO_2$ layer) only on the $SiO_2$ shell can be selectively deposited by repeating the Stöber reaction in the dispersion of purified $Fe_3O_4/SiO_2$ core/shell particles decorated with Au nanoparticles. It allows for the partial embedding of Au nanoparticles in the $SiO_2$ matrix (step III) when its thickness is less than the diameter of the Au nanoparticles, leaving partial surfaces of the Au nanoparticles exposed to the solution environment. The thickness of the second $SiO_2$ layer can be precisely tuned at the nanometer scale by controlling the reaction conditions, guarantying the surfaces of Au nanoparticles to be exposed at a pre-defined ratio. The thickness can be well controlled by the concentration of TEOS and the reaction time at the coating step III.

Next, the partially embedded A nanoparticles (also called seeds) are modified, such as by addition of a linker component, which is able to direct the binding of additional particles, or plating or growth of the seeds from the exposed portions of the seeds. As illustrated in FIG. 1, the core/shell/seed complex may be modified with a linker molecule. Adding an aqueous solution of cysteamine (HS—$CH_2$—$CH_2$—$NH_2$) to the dispersion of composite particles results in the selective graft of cysteamine molecules on the exposed Au surfaces due to the formation of strong covalent bonds between Au atoms and the —SH groups (step IV). The dangling amino tails of the cysteamine molecules extrude from the Au nanoparticle surfaces to exhibit activity towards interaction with other Au surfaces.

A second component B (which may be free-standing seed nanoparticles in certain embodiments) is then attached. As designed, the cysteamine molecules can serve as linkers to bind the free-standing Au nanoparticles to the partially embedded Au nanoparticles in the $SiO_2$ matrix once the composite particles are mixed with the free-standing citrate-stabilized Au nanoparticles (step V). The excess freestanding Au nanoparticles can be easily removed by applying an external magnetic field to selectively concentrate and purify the composite particles.

Then, addition of an appropriate amount of NaOH aqueous solution dissolves the $SiO_2$ and release the dimers made of Au nanoparticles after a removal of $Fe_3O_4$ particles by a magnetic field (VI). The $Fe_3O_4$ particles can be collected and reused in the new synthesis. Involvement of the superparamagnetic $Fe_3O_4$ particles in the synthesis is crucial for improving yield and purity of the final Au nanoparticle dimers because of the high selectivity and efficiency of magnetic separation.

Figure 2:
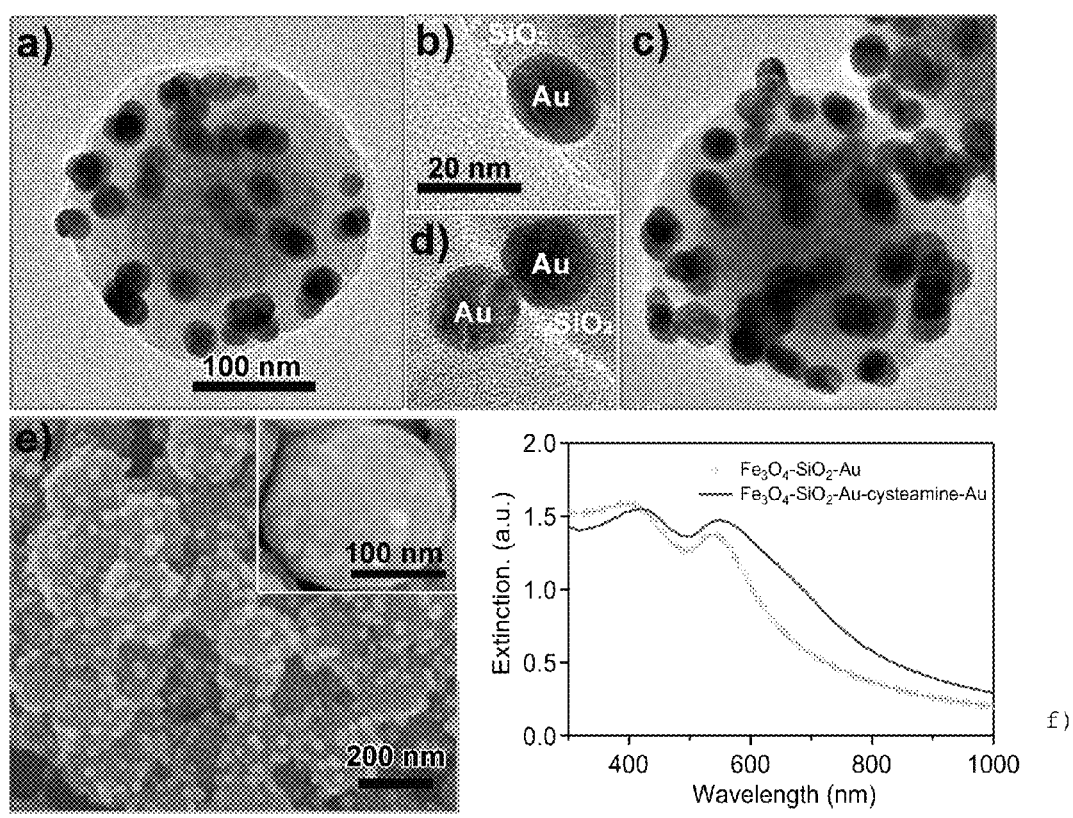
FIGS. 2a-d illustrate transmission electron microscopy (TEM) images of products formed at different stages for the synthesis of homodimers made of gold (Au) nanoparticles with diameters of ~15 nm. (a, b) Au nanoparticles partially embedded in the second $SiO_2$ layer on the $Fe_3O_4$—$SiO_2$ colloidal substrates. The enlarged TEM image in (b) shows that only a small portion of the Au nanoparticles' surfaces not embedded in the $SiO_2$ matrix. (c, d) dimers made of Au nanoparticles formed on the $Fe_3O_4$—$SiO_2$ colloidal substrates through the formation of chemical bonding between the linker molecules of cysteamine and Au nanoparticles. The enlarged TEM image in (d) shows that only one Au nanoparticle is attached to another Au nanoparticle that is partially embedded in the $SiO_2$ matrix. (e) typical scanning electron microscopy (SEM) image of the Au dimers on the $Fe_3O_4$—$SiO_2$ colloid substrates. (f) Ultraviolet (UV)-visible (vis)-Near Infrared (NIR) spectra of the composite particles shown in (a) and (c). Scale bars in (a) and (b) also apply to (c) and (d), respectively.

FIG. 2 presents electron microscopic images of the particles formed at different stages involved in the synthesis of dimers made of 15-nm Au nanoparticles. FIG. 2a shows a TEM image of the composite particles with Au nanoparticles essentially fully buried in $SiO_2$ matrix. Close observation reveals that the additional $SiO_2$ layer deposited in the second Stöber reaction is around 14 nm (FIG. 2b), which is very close to the average diameter (i.e., 15 nm) of the embedded Au nanoparticles. For certain embodiments, such deep embedment is important for the formation of dimers. Otherwise undefined agglomerations made of multiple Au nanoparticles are formed when no $SiO_2$ embedding exists or the $SiO_2$ embedding is shallow. The deeply embedded Au nanoparticles presented in FIG. 2b clearly shows that only a tiny fraction of the surface of individual Au nanoparticles is exposed to the surrounding solution to be modified with cysteamine molecules. Such selective surface modification in combination with the deep embedding only provides limited active sites to bind free Au nanoparticles, ruling out the possibility of attachment of multiple Au nanoparticles on each embedded Au nanoparticle.

The TEM image shown in FIG. 2c represents the particles derived from the particles shown in FIG. 2a after selective surface modification with cysteamine (step IV, FIG. 1) and attachment of free citrate-stabilized 15-nm Au nanoparticles are performed (step V, FIG. 1). The image of FIG. 2d clearly highlights that only one Au nanoparticle is attached to one embedded Au nanoparticle. The increased density of Au nanoparticles in FIG. 2c in comparison with that in FIG. 2a can act as a demonstration that additional Au nanoparticles link to the Au nanoparticles immobilized on the $Fe_3O_4/SiO_2$ colloidal substrates. The irregular contrast profiles in TEM images originate from the projection overlaps of multiple Au nanoparticles. The successful linking of free Au nanoparticles to the embedded Au nanoparticles can be further confirmed with SEM images (FIG. 2e) that are similar to those of the composite particles formed before the deposition of the second $SiO_2$ layer (i.e., the particles formed after step II, FIG. 1). The morphological similarity indicates the high yield of one-to-one binding between Au nanoparticles. In contrast, the composite particles obtained before the modification with cysteamine shows that surfaces of the composite particles are essentially smooth, indicating that the Au nanoparticles are almost fully embedded in the $SiO_2$ layer (inset, FIG. 2e). Only the very top surfaces of the Au nanoparticles are exposed if a close inspection is taken. This result is consistent with the non-uniformity in size of the Au nanoparticles. Only the Au nanoparticles with sizes larger than the thickness (i.e., 14 nm) of the second $SiO_2$ layer can partially expose their surfaces, while the Au nanoparticles smaller than 14 nm are completely covered with the second $SiO_2$ layer.

Figure 20:
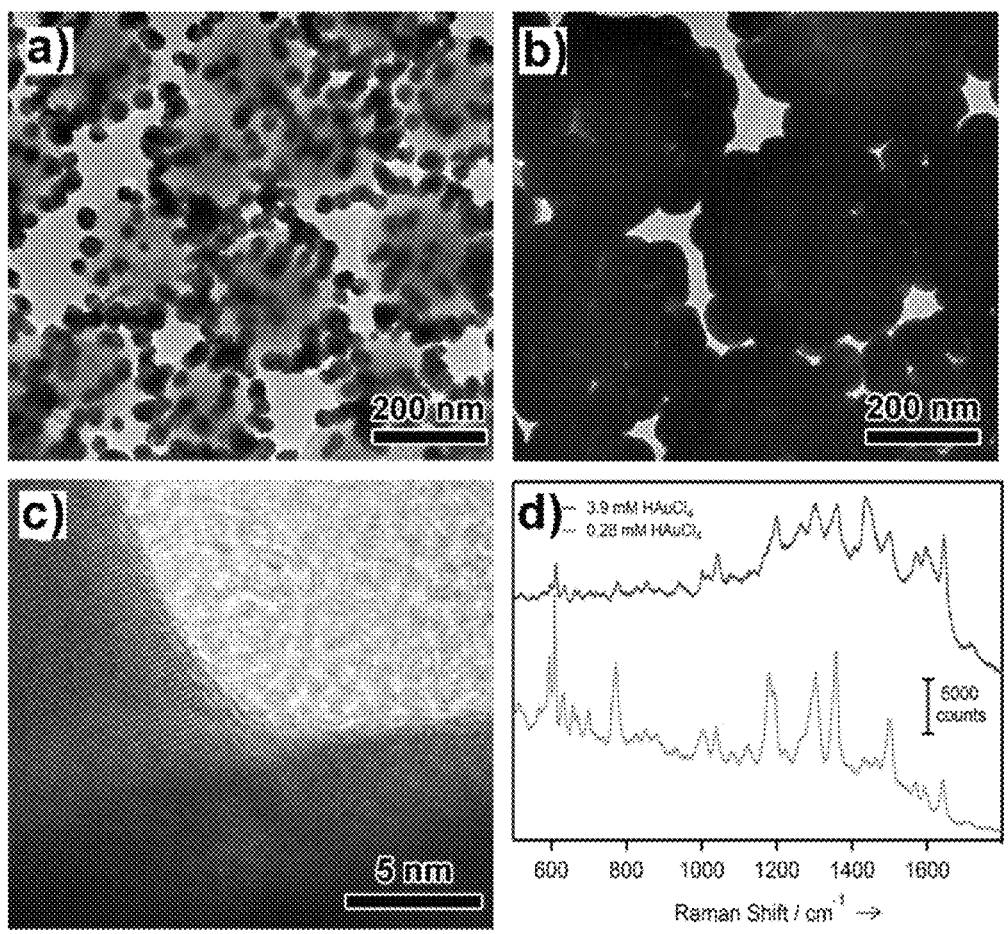
FIGS. 20a and 20b illustrate typical TEM images of MRMGPs formed from the plating reaction with different concentrations of $HAuCl_4$: a) 0.28 mM $HAuCl_4$ and b) 3.9 mM $HAuCl_4$.
FIG. 20c is a high resolution TEM image of the adjacent position between two neighboring Au nanoparticles shown in (b).
FIG. 20d illustrates SERS spectra of R6G (50 nM) obtained with MRMGPs shown in (a) and (b), respectively. The enhancements are much lower than the MRMGPs (of FIG. 12e) as shown in FIG. 16.

Due to strong surface plasmon resonance (SPR), Au nanoparticles exhibit intensive optical absorption that is influenced by a number of parameters including the aggregation state between Au nanoparticles. As a result, dimerization of the Au nanoparticles can be evaluated with the ultraviolet (UV)—visible (vis)—near infrared (NIR) spectroscopy. The dispersion of the composite particles shown in FIG. 2a (i.e., the $Fe_3O_4/SiO_2$ core/shell particles decorated with Au nanoparticles that are embedded in $SiO_2$ matrix) displays a light brick red color with broad absorption peaks at 411 nm and 534 nm assigned to the absorption of the $Fe_3O_4$ cores and the embedded Au nanoparticles, respectively (cross symbols, FIG. 20. When additional Au nanoparticles are bonded to the embedded Au nanoparticles to form dimers (as shown in FIGS. 2c and d), the dispersion of the composite particles undergoes a color change to light brick purple corresponding to redshift of the absorption peaks and the emergence of a broad shoulder in the range of 650-750 nm (solid line, FIG. 20. The shift of the peak from 534 nm to 550 nm is attributed to the change in the local dielectric environment around the Au nanoparticles that influences their SPR band. The appearance of the shoulder peak at longer wavelength is ascribed to the longitudinal SPR mode in the dimers due to the electromagnetic dipole coupling between the two Au nanoparticles in each dimer.

The dimers consisting of same Au nanoparticles can be released from the composite particles shown in FIGS. 2c-e by dissolving $SiO_2$ with sodium hydroxide (NaOH) etching. The $Fe_3O_4$ cores can be easily separated and removed with the assistance of a magnetic field, leaving a dispersion of only Au nanoparticles as shown in FIG. 3a. Dimers highlighted with cycles and ellipses represent the dominating structures in the product although isolated individual Au nanoparticles and clusters made of more two Au nanoparticles are also observed. An enlarged TEM image of a single Au dimer is presented in FIG. 3b, clearly showing a thin layer of silicates coated on the surfaces of the Au nanoparticles. The layer of silicates is formed during the sample drying process as residual silicates (that are formed from the dissolution of $SiO_2$ highlighted by step VI, FIG. 1) in solution are concentrated around the dimer surface. The absence of silicates in the gap between the two Au nanoparticles further proves that the dimers are indeed formed by linker-induced assembly in solution rather than on the substrates during drying. The gap between Au nanoparticles in each dimer is less than 1 nm corresponding to the use of small linker molecules (i.e., cysteamine).

A representative statistical analysis is shown in FIG. 3c, revealing the product is composed of 36% single Au nanoparticles, 54% dimers, and 10% of larger clusters with three or more Au nanoparticles. The yield of dimers is comparable to the best results reported in literature and can be further improved by improving the uniformity of Au nanoparticles. In this work, the Au nanoparticles exhibit a size distribution in the range of 13-17 nm. For the Au nanoparticles with sizes smaller than the thickness of the second $SiO_2$ layer (i.e., 14 nm), they are completely embedded in the $SiO_2$ matrix, preventing them from accessing other Au nanoparticles to from dimers. As a result, these small nanoparticles (with sizes <14 nm) represent the impurity, i.e., isolated single nanoparticles, in the product. The clusters made of more than two Au nanoparticles possibly originate from: i) random aggregation of isolated and dimer Au nanoparticles; ii) attachment of multiple Au nanoparticles on the embedded Au nanoparticles with larger sizes during step V of FIG. 1. For the Au nanoparticles with size much larger than the thickness of the second $SiO_2$ layer, they can expose surface area large enough to link multiple Au nanoparticles. The residual silicates as shown in FIG. 3b can be completely removed though thorough washing with water, leading to the collection of clean dimers as shown in FIG. 3d. The dimers are stable in aqueous solution for 4 months, indicating the strong bonding formed between cysteamine molecules and the Au nanoparticles.

In one embodiment, dimers may be made of nonequivalent nanoparticles, such as Au nanoparticles. In the process shown in FIG. 1, the Au nanoparticles used at step II and step V can be independent changed to form asymmetric dimers made of differently sized Au nanoparticles and differently shaped Au nanoparticles. For example, FIG. 4a presents a typical TEM image of the asymmetric Au dimers made of Au nanoparticles with size of ~33 nm and Au nanoparticles with size of ~15 nm.

Figure 3:
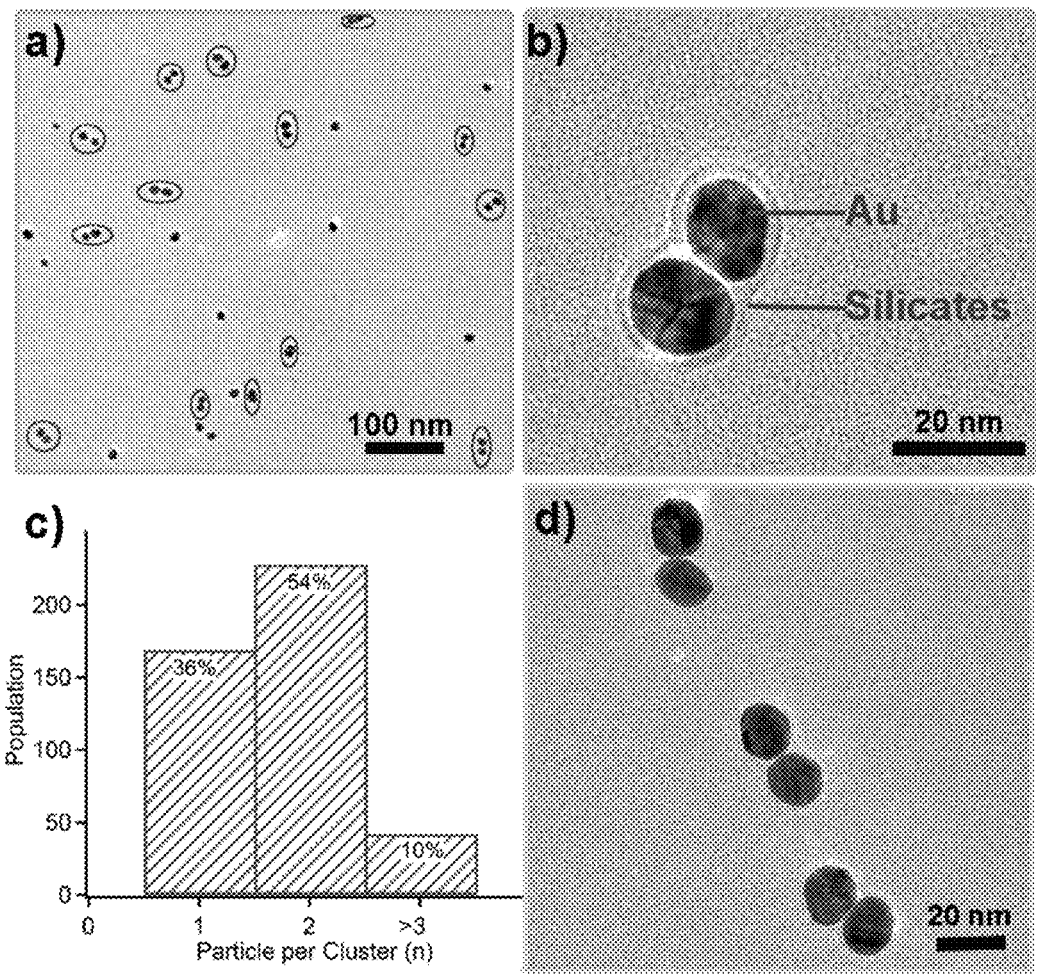
FIGS. 3a-d present the characterization results of the freestanding dimers made of 15-nm Au nanoparticles.

This sample is synthesized through the process similar to that used for the sample shown in FIG. 3 except 33-nm Au nanoparticles are used at step V of FIG. 1. Instead of the 33-nm Au nanoparticles, addition of Au nanorods to the synthesis solution at step V (FIG. 1) leads to the formation of asymmetric dimers shown in FIG. 4b. In each dimer, the Au nanoparticle attach to one end of the Au nanorod rather than the side surface of the nanorod. Such geometric selectivity is ascribed to the difference in reactivity between the end surfaces and side surfaces in Au nanorods. As for the Au nanorods synthesized with the assistance of cetyltrimethylammonium bromide (CTAB), their end surfaces are usually more reactive than their surfaces to benefit the selective formation of bonding between the cysteamine molecules with the end surfaces. Because the properties of Au nanoparticles are strongly dependent on their physical parameters including size and shape, the examples shown FIG. 4 indicate that various asymmetric Au dimers can be readily synthesized through our approach to exploit novel properties due to the coupling between the two different Au nanoparticles in each dimer.

In one embodiment, compositionally hybrid dimers are made, such as of Au nanoparticles and Ag nanoparticle. By choosing the appropriate linker molecules at step IV of FIG. 1, nanoparticles of different materials can be attached to the Au nanoparticles to form hybrid dimers made of different compositions. For instance, Ag nanoparticles with an average diameter of 11 nm can be attached to the 15-nm Au nanoparticles to form Au—Ag hybrid dimers when tetra-thiol molecules (e.g., pentaerythritol tetrakis(2-mercaptoacetate)) are used as the linkers. Due to the steric hindrance, only a fraction of the thiol groups in pentaerythritol tetrakis(2-mercaptoacetate) molecules can be grafted to the exposed Au surface at step IV of FIG. 1. The remaining free thiol groups in the tetra-thiol molecules extended in the solution to bind Ag nanoparticles added at step V of FIG. 1, facilitating the generation of hybrid dimers with high yield (FIG. 5a). Energy dispersive x-ray spectroscopy (EDS) has been used to confirm the hybrid compositions of the synthesized dimers. As shown in FIG. 5b, the EDS spectra of individual dimers are essentially the same and exhibit strong peaks of both Au and Ag, indicating the dimers highlighted in FIG. 5a are indeed made of hybrid compositions of Au and Ag. The existence of copper (Cu) peaks originates from the TEM Cu grid. FIG. 5c compares the optical absorption spectra of the pure Ag nanoparticles (cross symbols), pure Au nanoparticles (solid squares), and the Au—Ag hybrid dimers (solid line). The Au—Ag dimers exhibit absorption peaks close to the SPR band of both pure Ag and Au nanoparticles although these peaks red-shift (i.e., from 423 to 440 nm for Ag and from 530 to 535 for Au). In addition, the increased broadband absorption in the range of 550-800 nm is due to the electromagnetic dipole coupling between the SPRs of the Au and Ag nanoparticles.

Figure 6:
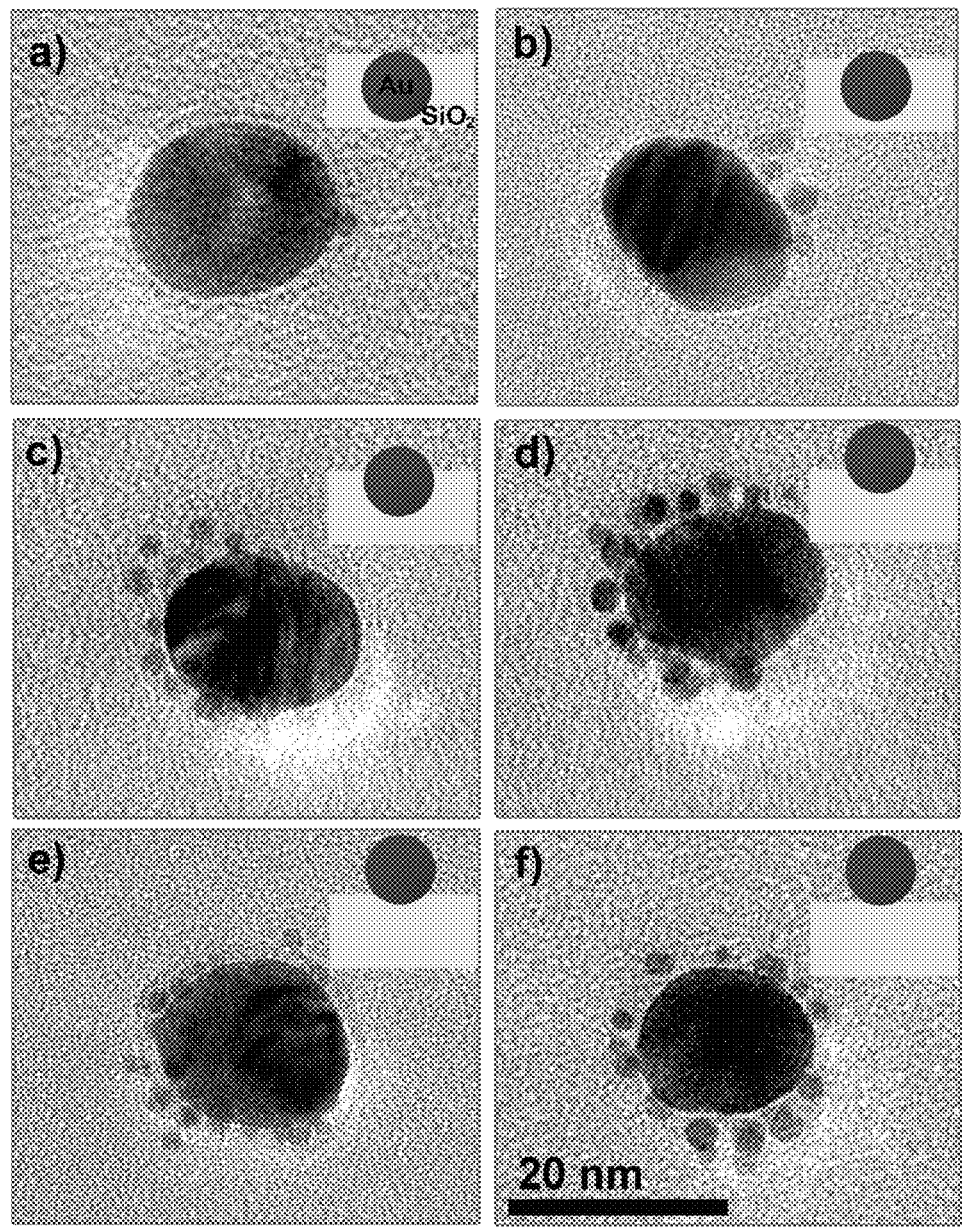
FIGS. 6a-f present the representative TEM images of nanoassemblies of Au nanoparticles with controlled asymmetries. From FIGS. 6(a) to (f), the portion of the exposed surfaces of the Au nanoparticles (~15 nm in size) increases, leading to more Au nanoparticles with smaller sizes (e.g., ~3 nm) to be attached to each Au nanoparticles to form coresatellite nanoassemblies with different asymmetries. The insets highlight how much surfaces of the Au nanoparticles (~15 nm) are exposed for modification with linker molecules.

In one embodiment, asymmetric core-satellite nanoassemblies may be created. One advantage of the method shown in FIG. 1 is that the percentage of the surfaces of the Au nanoparticles can be tuned to expose to solution for modification with linker molecules. The easiest way is to control the Stöber reaction conditions (e.g., reaction time, precursor concentration, etc.) at step III (FIG. 1) to tune the thickness of the second $SiO_2$ layer. As a result, novel assembly structures with tunable asymmetries can be achieved by varying the thickness of the second $SiO_2$ layer. For example, multiple free Au nanoparticles can be attached to a 15-nm Au nanoparticle partially embedded in $SiO_2$ matrix when the free Au nanoparticles have sizes much less than 15 nm, leading to the formation core-satellite assemblies. FIG. 6 compares the core-satellite assemblies made of 15 nm Au nanoparticles as cores and 3-nm Au nanoparticles as satellites. The schematic inset in each image illustrates how deep the 15-nm Au nanoparticles are embedded in the $SiO_2$ matrix during step III of FIG. 1. The comparison in FIG. 6 clearly shows that larger exposed surface area can bind more 3-nm Au nanoparticles. The number of satellites on each assembly can be finely tuned by varying the thickness of the second layer of $SiO_2$.

Figure 7:
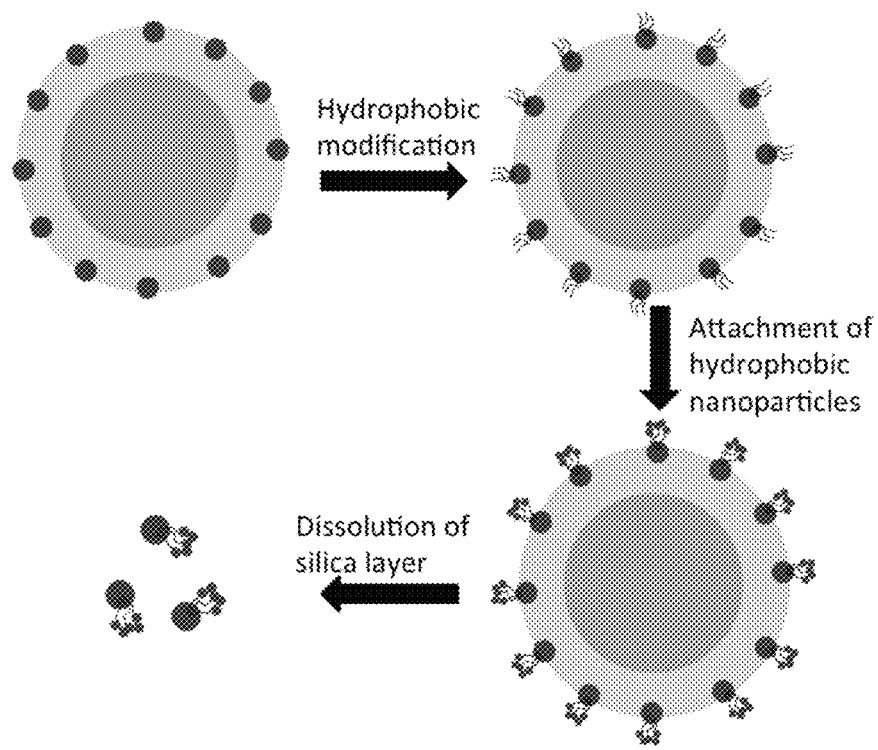
FIG. 7 illustrates the process for the synthesis of amphiphilic nanoparticles with asymmetric surface chemistries, i.e., with both hydrophobic and hydrophilic patches. Such amphiphilic nanoparticles can induce the formation of asymmetric nanoassemblies on the basis of long-range hydrophobic-hydrophobic interactions.

In one embodiment, amphiphilic nanoparticles with both hydrophobic and hydrophilic surface regions can also be synthesized by following the steps of FIG. 7. During the fabrication, hydrophobic alkyl thiol molecules (e.g., 9-mercapto-1-nonanol) are used to modify the citrate-capped Au nanoparticles at step W. When the thiol molecules are bonded to the exposed Au surfaces through the strong S—Au bonds, the exposed Au surfaces switch to hydrophobic state due to the long alkyl tails of the thiol molecules. Such modification enables the composite particles to disperse in tetrahydrofuran (THF) that is a co-solvent for hydrophobic nanoparticles. At the second step of FIG. 7, hydrophobic nanoparticles made of varying materials in hexane are added to the THF dispersion of the composite particles. Drying the mixed dispersion directs the hydrophobic nanoparticles to assemble on the exposed hydrophobic surfaces of the Au nanoparticles due to hydrophobic-hydrophobic interactions. Because hydrophobic-hydrophobic interaction is a long-range force, multiple layers of hydrophobic nanoparticles can be assembled on each Au nanoparticles. Dissolving the $SiO_2$ exposes the unmodified hydrophilic Au surfaces, resulting in the free-standing amphiphilic nanoassemblies. FIGS. 8a and b present the amphiphilic nanoassemblies obtained with the use of hydrophobic Au nanoparticles (~4 nm) and $Fe_xO_y$@Fe core@shell nanoparticles. The amphiphilic feature of the nanoassemblies is further illustrated by the fact that these nanostructures are stable at the interface of water/hexane (FIG. 8d). Therefore, our strategy provides a simple route to fabricate novel amphiphilic asymmetric nanostructures with multiple functions that are difficult (or even impossible) to synthesize with conventional methods.

Figure 9:
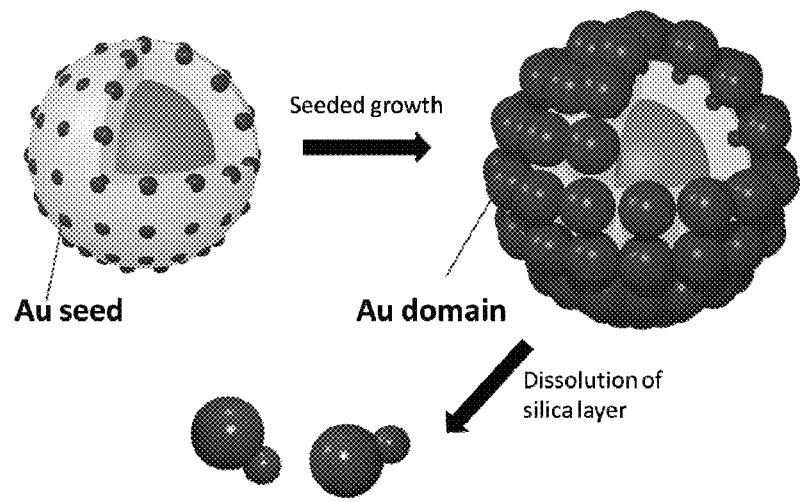
FIG. 9 illustrates the process for the synthesis of Au nanoparticles with asymmetric shapes through a seeded growth on partially exposed Au seeds.
Figure 10:
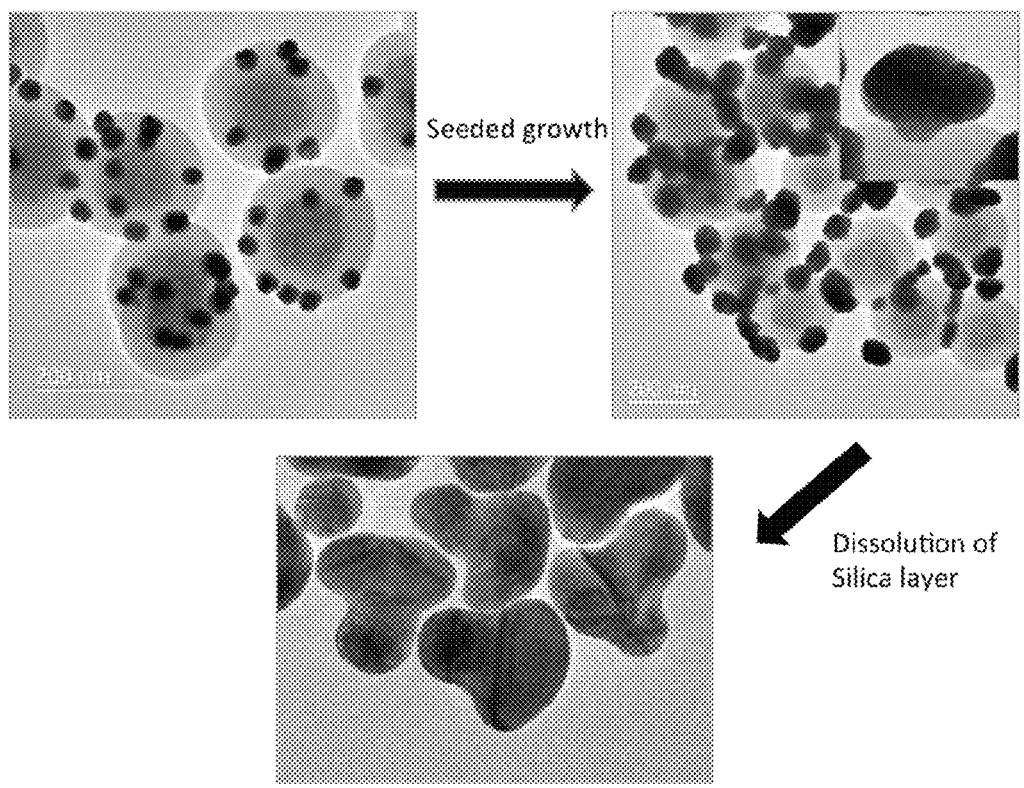
FIG. 10 presents a series of TEM images of the products formed during the production of asymmetric Au nanoparticles (i.e., tooth-like Au nanoparticles) by following the procedure shown in FIG. 9.

In one embodiment, the designed approach can be utilized for the fabrication of complicated asymmetric nanoparticles and composite nanostructures other than asymmetric nanostructures by the assembly from nanoparticle building blocks. FIG. 9 illustrates a modified approach for synthesizing 'tooth-shaped' asymmetric nanoparticles by a seeded-growth of the Au seeds that are partially embedded in the magnetic submicron substrates. Images in FIG. 10 demonstrate the corresponding steps for the fabrication of tooth-shaped Au nanoparticles.

Figure 11:
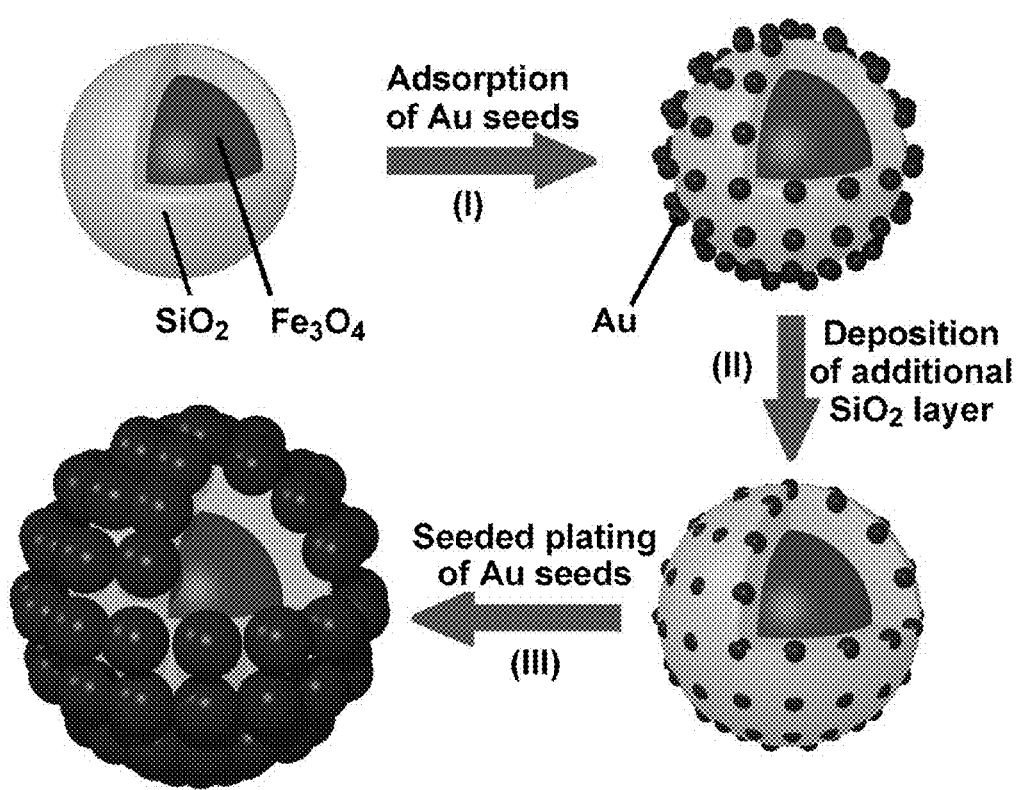
FIG. 11 is an illustration of the major steps in one embodiment of methods of the present invention for synthesize magnetic, raspberry-shaped, mesoscopic gold particle ("MRMGP").

In addition, more complicated structures such as magnetic, raspberry-shaped, mesoscopic gold particles (MRMGPs) can be obtained if the $SiO_2$ layer has not been removed (FIG. 11). "MRMGPs" can be used as excellent substrates for ultrasensitive SERS analysis of solution species. The MRMGPs offers a number of advantages over the conventional SERS substrates: 1) the size of the Au nanoparticles on the MRMGPs and the inter-particle gaps between the individual Au nanoparticles can be easily tuned by controlling the seed-mediated plating process (step III, FIG. 11); 2) the incorporation of the superparamagnetic $Fe_3O_4$ nanoparticle cores enables the "concentration effect" to enrich analyte species in sample solutions, leading to the capability of analysis with ultra low detection limit down to femtomolar in concentration; 3) the excellent dispersibility of the MRMGPs in aqueous solution and high surface area of Au nanoparticles benefits the hot spots to be fully accessible by analyte species; 4) the robust synthesis of the MRMGPs enables the good reproducibility of SERS performance. Combining the ultrasensitive SERS detection with other advanced technologies, such as lab-on-chip, can provide high throughput diagnostics.

FIG. 11 highlights the major steps involved in the growth of Au nanoparticles on $Fe_3O_4$ particles with the assistance of amorphous $SiO_2$ layers. It is worth noting that the addition of the second $SiO_2$ layer only increases the thickness of the original $SiO_2$ layer rather than completely burying the Au seeds, leaving part of the surfaces on Au seeds exposed to the surrounding liquid environment. As a result, the Au seeds are able to grow larger in a plating solution, such as one containing $HAuCl_4$ (Au precursor) and ascorbic acid (reducing reagent), via a seed-mediated electroless deposition (step III). See, e.g., Gao, C.; Zhang, Q.; Lu, Z.; Yin, Y. *J. Am. Chem. Soc* 2011, 133, 19706-19709; see also, Ziegler, C.; Eychmueller, A. *J. Phys. Chem. C* 2011, 115, 4502-4506, both incorporated herein by reference. By controlling the plating process, the size of the resulting Au nanoparticles as well as the gaps between adjacent nanoparticles can be adjusted to achieve different coupling behaviors between surface plasmons of adjacent Au nanoparticles. The resulting hybrid particles exhibit morphologies similar to the raspberry and they are described as magnetic, raspberry-shaped, mesoscopic gold particles (MRMGPs) for simplicity. The MRMGPs exhibit both superparamagnetic property and stable SERS hot spots formed between individual Au nanoparticles on the surfaces of the MRMGPs.

For certain embodiments, the second $SiO_2$ layer deposited at step II plays the crucial role to assist the successful synthesis of stable MRMGPs. This additional $SiO_2$ layer not only glues the Au nanoparticles and the $Fe_3O_4$ cores together but also adjusts the growth of Au nanoparticles on the surfaces. For the hybrid particles synthesized, the size of the Au nanoparticles can be controlled to tune the inter-particle gaps for the generation of SERS hot spots and the stability has been greatly improved. Since each $Fe_3O_4$ particle can be decorated with a large number of Au nanoparticles, numerous hot spots can be formed on each hybrid particle to enhance SERS remarkably. In addition, an external magnetic field can be applied to promote an increase of hot spots, by which the detection limit of solution-phase SERS can be further extended.

Figure 12:
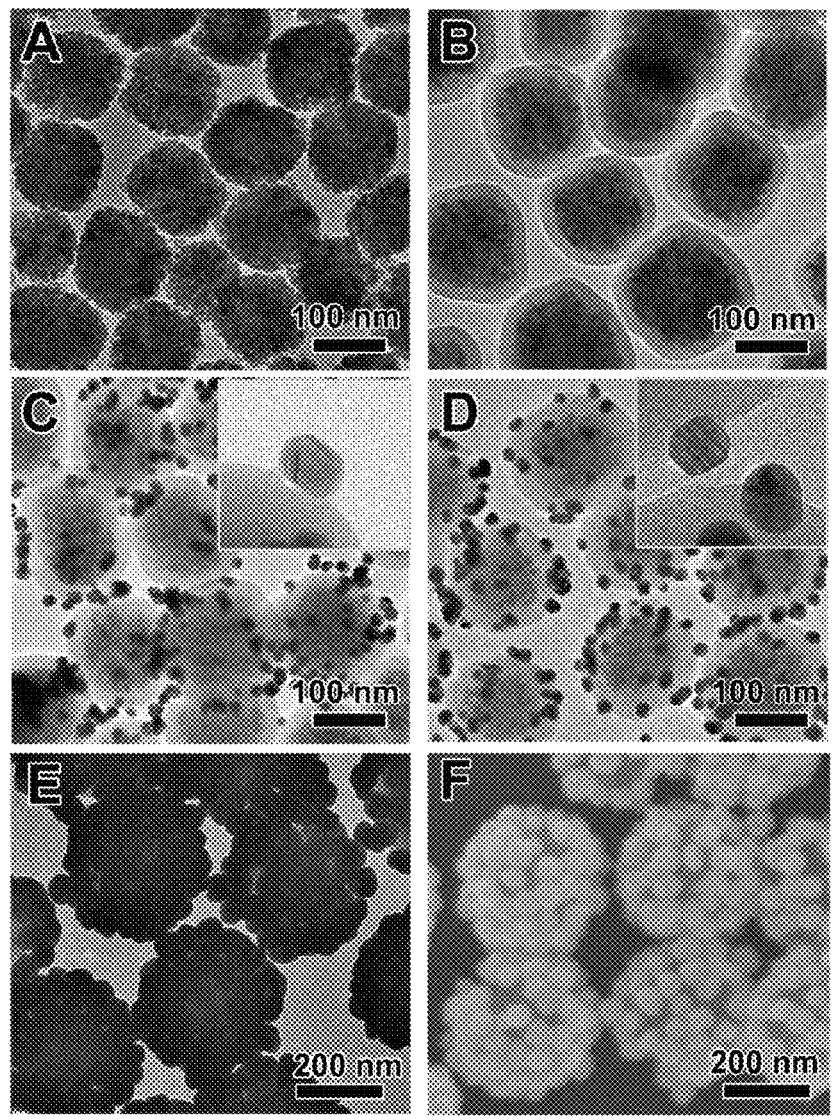
FIGS. 12a-f present TEM and SEM images of the products formed during the synthesis of MRMGPs: Figure (a) superparamagnetic $Fe_3O_4$ NPs, Figure (b) $Fe_3O_4$—$SiO_2$ core-shell nanoparticles, Figure (c) $Fe_3O_4$—$SiO_2$ core-shell colloidal substrates with Au nanoparticles that can serve as seeds for seeded growth, Figure (d) the $Fe_3O_4$—$SiO_2$—Au composite particles after a second layer of $SiO_2$ to partially embed the Au seeds in the $SiO_2$ matrix, FIGS. 12(e) and 12(f) MRMGPs formed following additional Au plating of the exposed Au seeds to a size of about 60 nm FIG. 13 compares the UV-Vis-NIR spectra of components used in or synthesized by embodiments of the present invention, illustrated as denoted on the graph are spectra for the Au seeds (~15 nm), the $Fe_3O_4$ particles, the $Fe_3O_4$—$SiO_2$ core-shell particles decorated with Au seeds (of FIG. 12c), and the as-synthesized MRMGPs (of FIG. 12e).

FIG. 12 presents a series of transmission electron microscopy (TEM) and scanning electron microscopy (SEM) images of the products formed at different synthetic stages by using magnetic core particles, in the illustrated example embodiment $Fe_3O_4$ nanoparticles with an average diameter of 120 nm as the starting material. As shown in FIG. 12A, each core, e.g., $Fe_3O_4$ nanoparticle, represents an assembly of many crystalline domains, for certain embodiments with $Fe_3O_4$ such domains have a size less than 10 nm. Such bimodal length scale in the $Fe_3O_4$ nanoparticles allows them to preserve superparamagnetic property at room temperature. This property of the $Fe_3O_4$ core allows the nanoparticles to be easily removed from the solution by applying an external magnetic field and re-dispersed with removal of the magnetic field. The coating, e.g. $SiO_2$ coating (~25 nm in thickness in the illustrated embodiment), on the core, e.g., $Fe_3O_4$ nanoparticles (FIG. 12b), and the sequential surface modification with an organosilane, such as 3-aminopropyltriethoxysilane ("APTS"), enables the surface decoration with Au seeds of ~15 nm in diameter (FIG. 12c). The distribution of the Au seeds on the $Fe_3O_4$—$SiO_2$ particles is fairly uniform. The special affinity between amino group and Au helps to ensure the uniformity of the Au seeds on the core/shell. Under strong sonication, the possibility of collision between Au and the entire surface of $Fe_3O_4$—$SiO_2$ particles can be very similar, thus assuring the uniform adsorption.

After the addition of a second coating layer, e.g., a second $SiO_2$ layer, the thickness of the $SiO_2$ coating has been increased by ~7 nm (compared with FIG. 12c) and the Au seeds are partially (~50% in the illustrated embodiment) embedded in the $SiO_2$ matrix (FIG. 12d). The surfaces of the Au seeds extruding out of the $SiO_2$ matrix are free of $SiO_2$ (inset, FIG. 12d). The preferential deposition of the second $SiO_2$ layer on the existing $SiO_2$ coating rather than on Au can be ascribed to the difference in surface chemistry between them. The exposed surfaces of the Au seeds can promote a seed-mediated electroless plating to grow the seeds into larger Au nanoparticles, resulting in the formation of MRMGPs with tunable gaps between adjacent Au nanoparticles (FIG. 12e).

Figure 13:
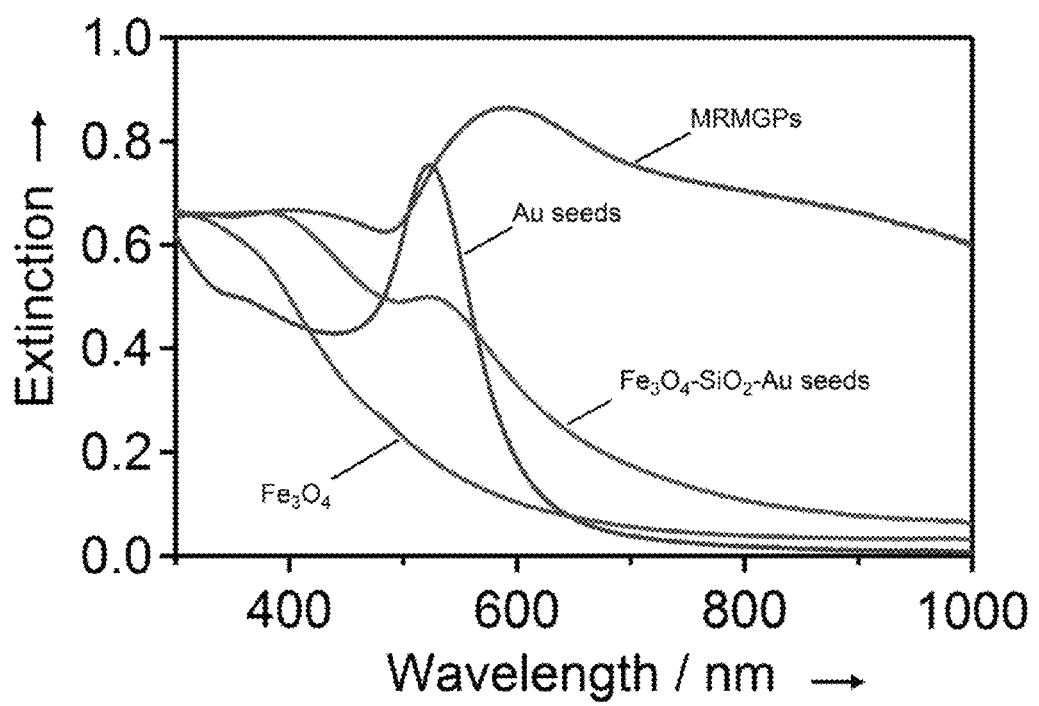
Figure 14:
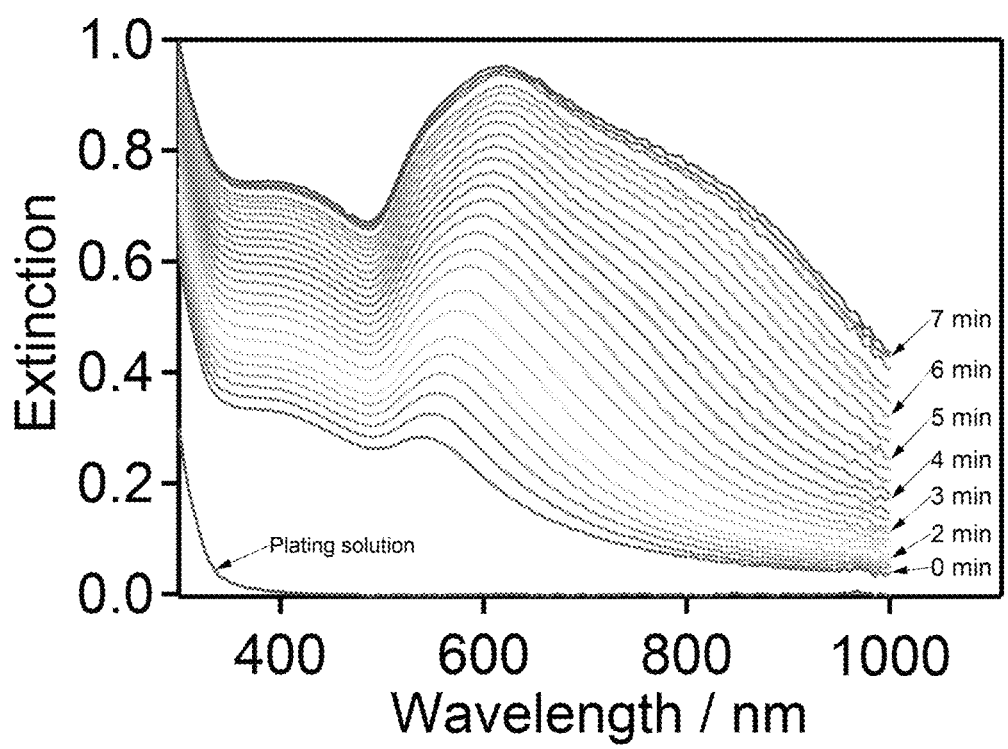
FIG. 14 shows the UV-Vis-NIR spectra of the MRMGPs formed at various times (denoted on the graph) during the seeded plating process

Due to the strong surface plasmon resonance (SPR) of the Au nanoparticles, the evolution process of MRMGPs can be monitored by continuously recording their optical absorption spectra (FIG. 14). Before the plating proceeds, a dispersion of the particles with attached Au seeds (FIG. 12d) displays a brick red color with absorption peaks at 410 and 530 nm assigned to the absorption of the $Fe_3O_4$ cores and the Au seeds (FIG. 13), respectively. Once the plating reaction starts, the color of the dispersion changes quickly to boysenberry, then blue-purple, and finally dark electric blue. The color variation corresponds to the redshift of the absorption peak from 530 nm to 635 nm when the surface Au nanoparticles grow. Meanwhile a new shoulder peak gradually emerges at longer wavelength, indicating the coupling of the surface plasmons between adjacent Au nanoparticles as inter-particle distance decreases. Once the plating time is long enough, the inter-particle distance approaches zero, leading to the formation of very narrow gaps between the Au nanoparticles on the surfaces of the synthesized MRMGPs (FIGS. 12e and 12f). In one embodiment, the end point for growth of the desired nanoparticles is determined from spectra and TEM images. There is a correlation between the size of the inter-particle distance and the observed new shoulder peak that enables one to determine when the plating should stop. Thus, in one embodiment, growth is based on the statistics of the distance and the amount of $HAuCl_4$ and related with spectra.

The gaps between Au nanoparticles on the surface of MRMGPs can be tuned by controlling the size of Au nanoparticles when the concentration of $HAuCl_4$ in the growth solution is determined and a defined long plating time is given. The long time plating completely consumes $HAuCl_4$ to automatically cease the reaction, preventing the variability of the Au nanoparticles during the following separation and purification treatments. For example, if the hybrid particles (FIG. 12d) react with a less-concentrated plating solution, MRMGPs with well isolated Au nanoparticles on the surfaces can be produced (FIG. 20a), exhibiting weak inter-particle coupling in the absorption spectrum. In contrast, an over-concentrated plating solution allows the formation of MRMGPs with relative large Au nanoparticles fused together (FIGS. 20b and 20c). It should be appreciated that if the plating is allowed to continue, the fusion of adjacent Au nanoparticles significantly decreases the number of narrow inter-particle gaps in comparison with the sample shown in FIG. 12e. This reduction in the number of hot spots greatly weakens the nanoparticles' capability in SERS enhancement (FIG. 20d). The SERS enhancement of the MRMGPs shown in FIG. 20a and FIG. 20b was not as good as that with MRMGPs in FIG. 15d (prepared with 1.7 mM HAuCl4). The reason was that the relative large gaps between Au nanoparticles in FIG. 20a caused the poor coupling of surface plasmons between the Au nanoparticles. For the MRMGPs shown in 20b, the number of hot spots was greatly reduced when overgrown Au nanoparticles fused together.

Figure 15:
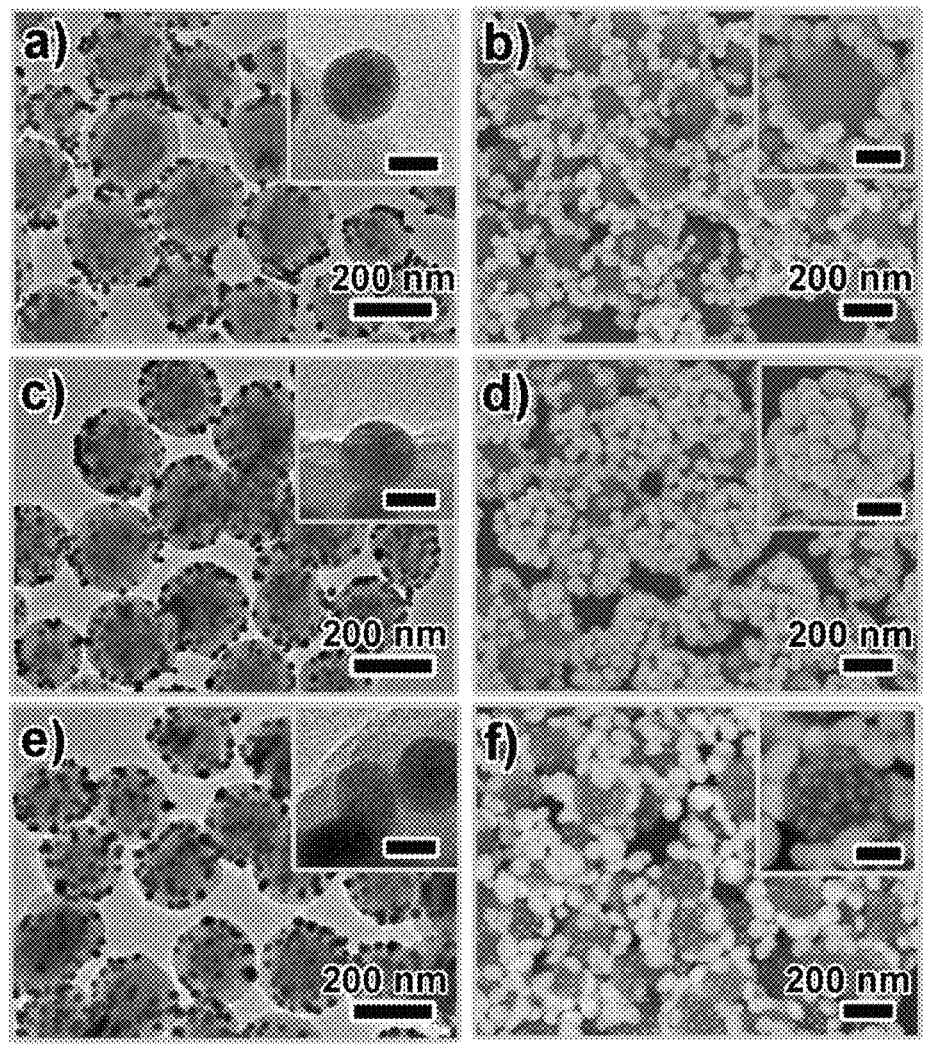
FIGS. 15a-e illustrate the impact of the thickness of the second $SiO_2$ layer on the MRMGPs morphology through TEM image of the $Fe_3O_4$—$SiO_2$—Au composite particles coated with a second $SiO_2$ layer that has different thickness.

The density of narrow gaps on MRMGPs is also strongly dependent on the thickness of the secondly deposited coating layer that stabilizes the Au seeds (step II, FIG. 11). If the second coating layer is thinner than ⅓ of the diameter of the Au seeds (d) (i.e., shallowly embedded Au seeds), a large percent of Au nanoparticles may detach from the particle surfaces during the plating process (step III in FIG. 11). The shallowly embedded Au seeds offer weak binding between the $SiO_2$ matrix and the corresponding larger Au nanoparticles. As shown in FIG. 15a, the thickness of the second $SiO_2$ layer (h) in the hybrid particles is ~4 nm that is about d/4. The corresponding MRMGPs (FIG. 15b) clearly show that many Au nanoparticles fall off and smooth $SiO_2$ surfaces are exposed. If d/3<h<d (FIG. 15c), the detachment of Au nanoparticles can be essentially eliminated during the plating process. The produced MRMGPs (FIG. 15d) are fully covered with large Au nanoparticles and high density of narrow gaps can be formed. The narrow gaps between individual Au nanoparticles on the MRMGPs shown in FIG. 15d provide ideal hot spots for efficient enhancement of Raman signals of molecules adsorbed on the particles. In addition, the good stability and dispersibility of the MRMGPs in aqueous solutions make them to be ideal SERS substrates for sensitive detection of interesting solution species, such as trace organic pollutants in water, biological molecules in body fluids, etc.

When h>d, the Au seeds can be completely buried in the $SiO_2$ matrix and the seed-mediated plating process cannot be initiated, as no Au seed has an exposed surface outside of the coating. For instance, most of the Au seeds are totally embedded after the deposition of the second $SiO_2$ layer with a thickness of ~17 nm, slightly larger than d (FIG. 15e). Because of the size distribution of the Au seeds, a small fraction of seeds with diameters slightly larger than 17 nm still expose partial surfaces to promote the plating reaction. Only a small portion of the Au seeds grow into larger particles while the others are intact and maintain their original size, as demonstrated by a backscattering SEM image of the as-synthesized particles (FIG. 15f). Therefore, precise deposition of second $SiO_2$ layer with desired thickness is crucial in the synthesis of MRMGPs with high density of narrow inter-Au nanoparticle gaps.

Figure 16:
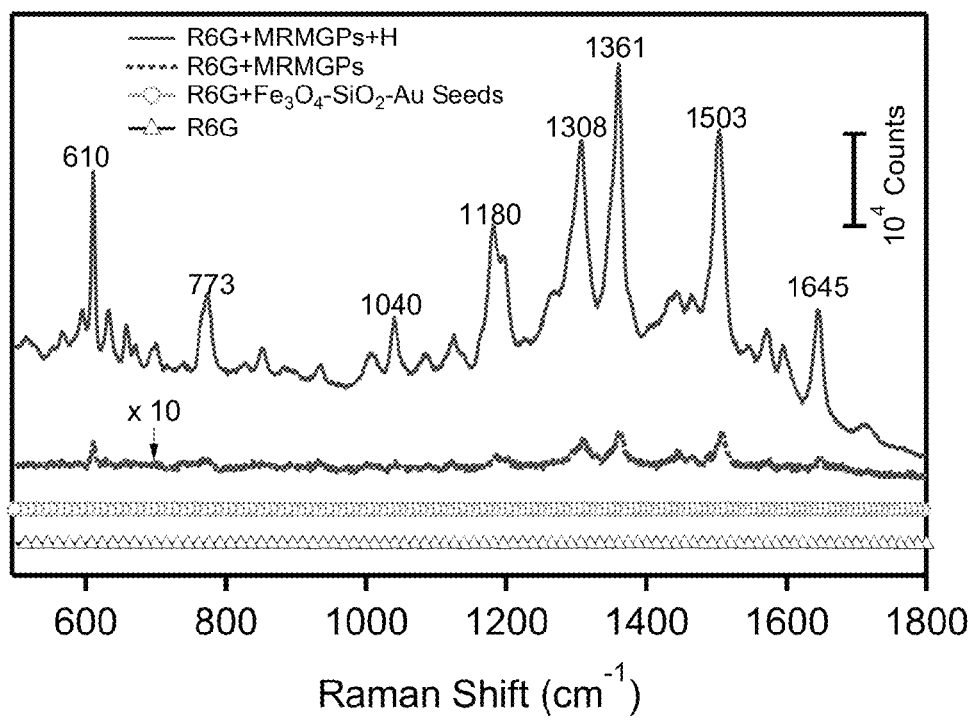
FIG. 16 is a set of SERS spectra for pure rhodamine 6G (R6G) (2 nM), R6G (2 nM) with $Fe_3O_4$—$SiO_2$—Au seeds core—shell particles (of FIG. 12c), and R6G (2 nM) with MRMGPs (of FIG. 12e) in or out of an external magnetic field, respectively.
Figure 18:
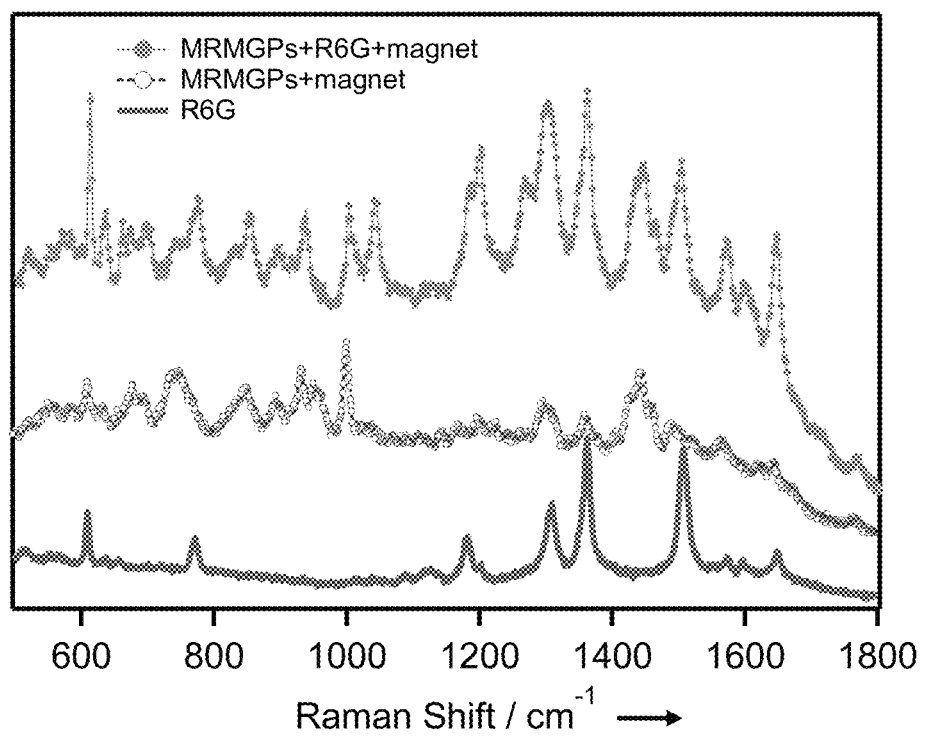
FIG. 18 is the SERS spectra of an aqueous solution of pure R6G (1 mM, solid line), the MRMGPs (of FIG. 15d) in pure water concentrated by an external magnetic field (hollow circles), and the MRMGPs in a R6G (200 pM) solution after concentration with an external magnetic field (solid dots).
Figure 19:
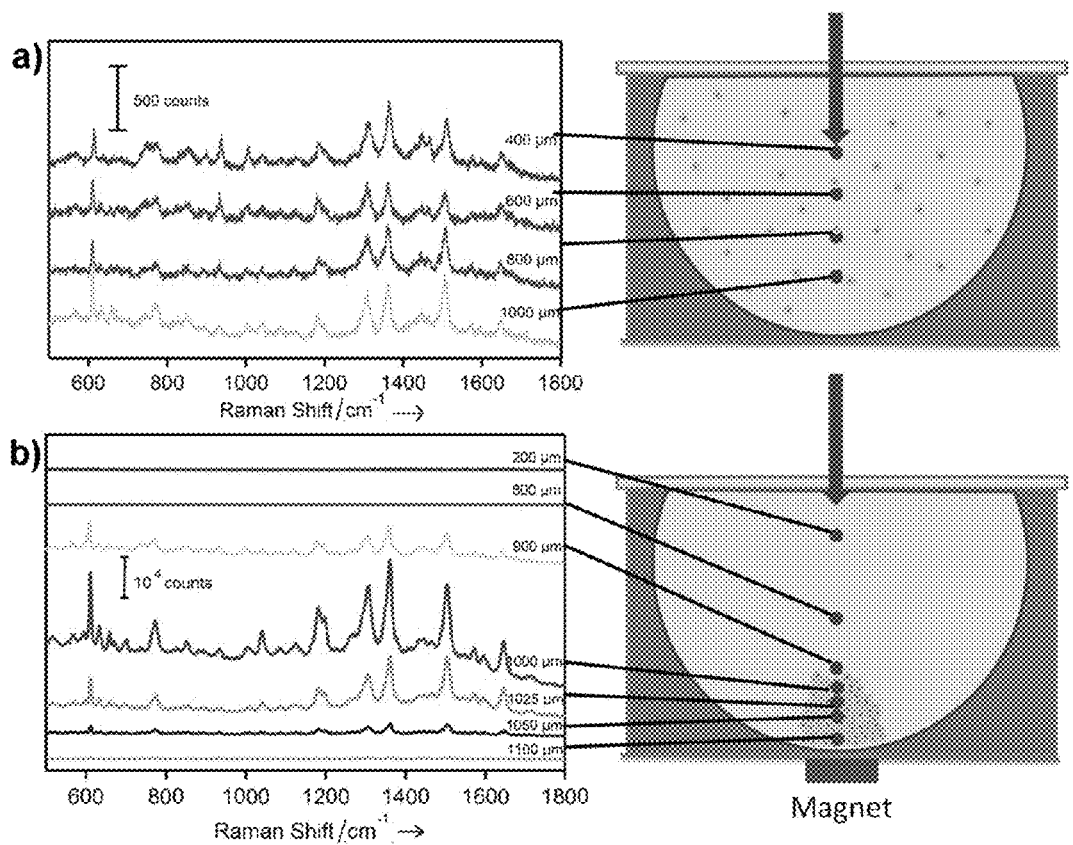
FIGS. 19a-b are the SERS spectra of R6G (2 nM) with MRMGPs at different positions in the solution a) before and b) after an external magnetic field is applied. The red spots in the right schemes highlight the positions focused by the excitation laser.

Rhodamine 6G (R6G), a common molecule used for testing SERS activity on silver but generally hard to detect on gold substrates, has been selected as a model material for evaluating SERS efficiency of the MRMGPs. As shown in FIG. 16, direct excitation of an aqueous R6G solution (2 nM) with a focused laser beam of 785 nm cannot generate detectable Raman signal (open triangles). Addition of the hybrid particles formed before the plating process (FIG. 15c) into the R6G solution is still not capable of enhancing the Raman signal to a detectable level (open circles, FIG. 16). Once the MRMGPs shown in FIG. 15d are added to the R6G solution, strong Raman signals can be detected (dotted curve, FIG. 16). The dramatically increased Raman intensity suggests that the hot spots are indeed generated by the narrow gaps between individual Au nanoparticles on the MRMGPs, improving the Raman response of R6G adsorbed on the Au surfaces. The good dispersibility of the MRMGPs can be proved by essentially the same Raman spectra when the excitation laser is focused at different positions in the solution (FIG. 19a). The enhancement factor (EF) of the dispersed MRMGPs is estimated to be ~0.91×10$^5$ according to the intensity of the peak at 611 cm$^{-1}$ by using the Raman spectrum of R6G solution (1 mM) as a reference (solid line, FIG. 18). The value of the EF is high when compared with that of Au nanoparticles' solution-phase SERS in literature and is comparable to the reported results on Ag nanoparticles in solutions. The observed peak at 610 cm$^{-1}$ originates from the in-plane xanthenes ring deformation. The peak located at 1308 cm–1 corresponds to the in-plane xanthenes ring breath (N—H) bend mode and $CH_2$ wag mode. The peaks at 773 and 1180 cm$^{-1}$ correspond to the v(C—H) out-of-plane bend mode and the v(C—H) in-plane bend mode, respectively. The v(C—C) stretching mode is reflected by the peaks at 1361, 1503, and 1645 cm$^{-1}$.

In certain embodiments, further enhancement of SERS signal can be achieved when the MRMGPs are concentrated by applying an external magnetic field due to the superparamagnetic property of the $Fe_3O_4$ cores. Since R6G cations are adsorbed on the Au surfaces of the MRMGPs, these target molecules can be enriched and excited by focusing the same laser beam on the concentrated MRMGPs to enhance the Raman peak intensity. In addition, new hot spots can be generated between the MRMGPs after concentration with a magnet. The "concentration effect" leads to a further increase in Raman intensity by 2-3 orders of magnitude without any change of the measurement confirmation, indicating a total enhancement on the order of ~10$^8$ in SERS signal (solid curve versus dotted curve, FIG. 16). In the meantime, no Raman signal can be detected from the bulk solution (FIG. 19b), indicating that all the MRMGPs have been concentrated. The collected MRMGPs can re-disperse when the magnetic field is removed and the solution is shaken. Placing the solution in the same magnetic field enables to concentrate the MRMGPs again to generate similar Raman spectrum. The consistency of Raman spectra from different measurements shows the reproducible assembly of the concentrated MRMGPs by the magnetic field.

Figure 17:
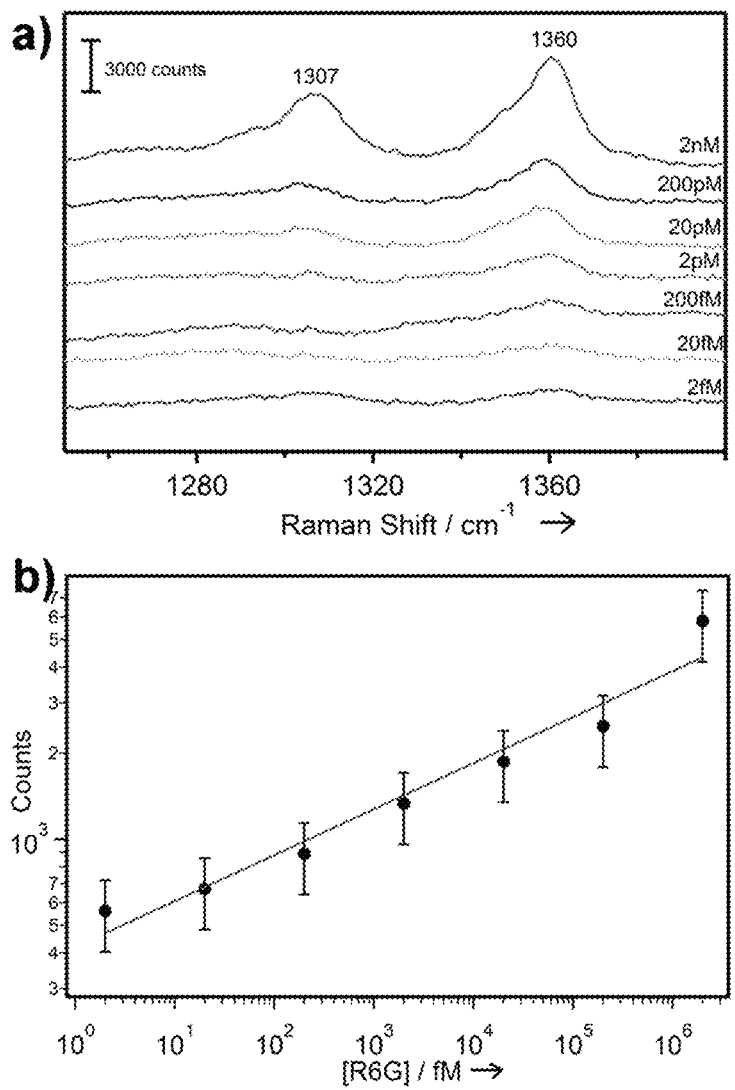

Analyte at ultra low concentrations (e.g., femto molar) can be detected by SERS with the use of the MRMGPs. The dependence of Raman response on the concentration of R6G has been studied. Because trace amount of polyvinyl pyrrolidone (PVP) molecules remaining on the MRMGPs produce weak Raman peaks that are close to the characteristic peaks of R6G under the same conditions (FIG. 18), the measurement spectra for solutions at low concentrations are corrected by subtracting the PVP background signal in order to highlight the contributions from R6G. FIG. 17a plots the SERS spectra of a number of R6G solutions with different concentrations. Comparison of these spectra clearly shows that the SERS peak intensity of R6G gradually decreases as the concentration of R6G is changed from 2 nM to 2 fM (FIG. 17b). Discernable peaks can be well recognized at the concentration of 2 fM, indicating that the synergic "concentration effect" and high SERS efficiency of the MRMGPs are promising for ultrasensitive probing of interesting species in solutions.

Figure 21:
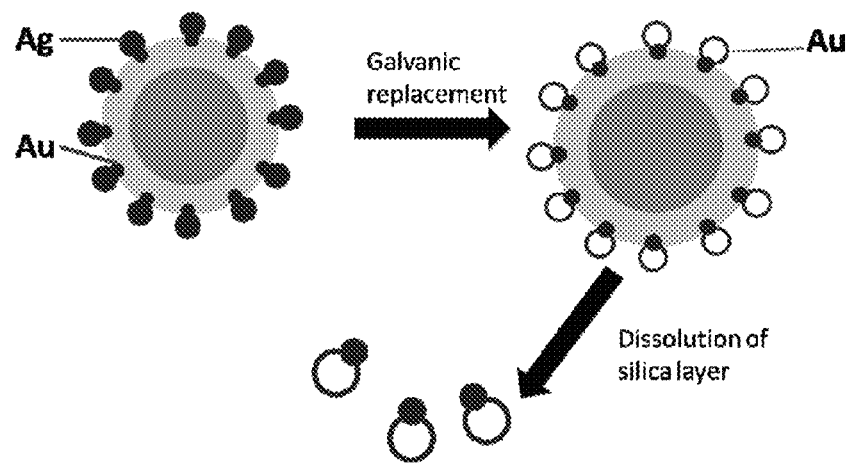
FIG. 21 illustrates the growth of Ag nanoparticles on the Au seeds through a seeded growth process. The Ag portion can undergo a galvanic replacement reaction to form hollow nanoshells, resulting in asymmetric nanoparticles with a complex morphology.

In one embodiment, the magnetic $Fe_3O_4/SiO_2$ core/shell particles with a second $SiO_2$ mediation layer may be used to create Au—Ag anisotropic nanoparticles. FIG. 21 illustrates the use of the seeded growth of Ag on the Au seed. Dissolution of the mediation layer provides asymmetric Au—Ag particles. It should be appreciated that Pt or Pd nanoparticles may also be grown on the Au seeds.

Figure 22:
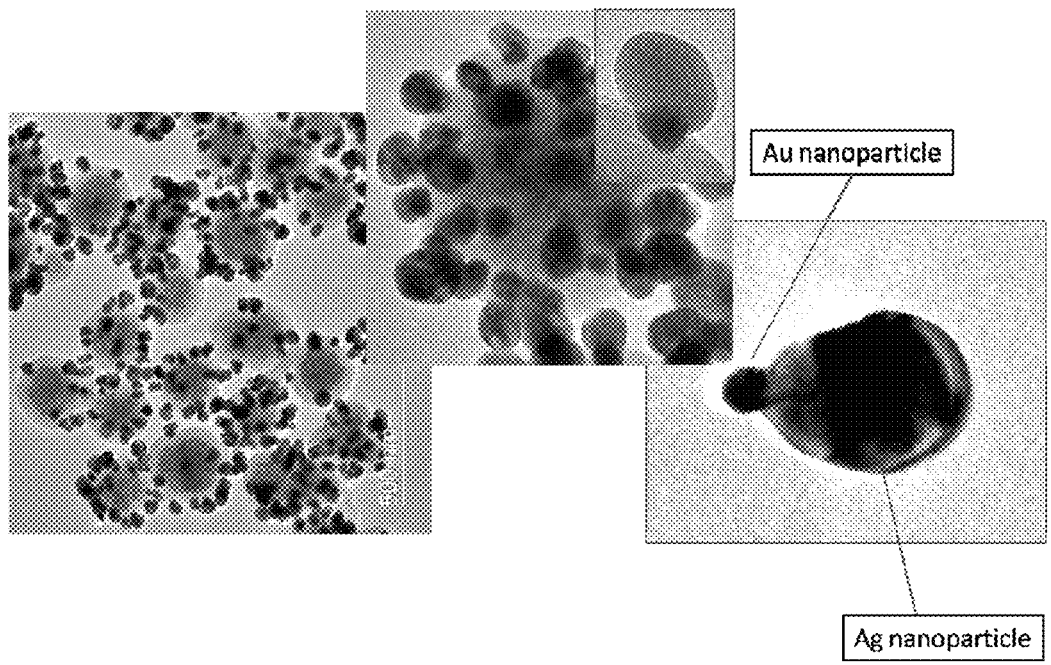
FIG. 22 illustrates a series of TEM images of the Au—Ag asymmetric hybrid nanoparticles synthesized through the seeded growth process shown in FIG. 21.
Figure 23:
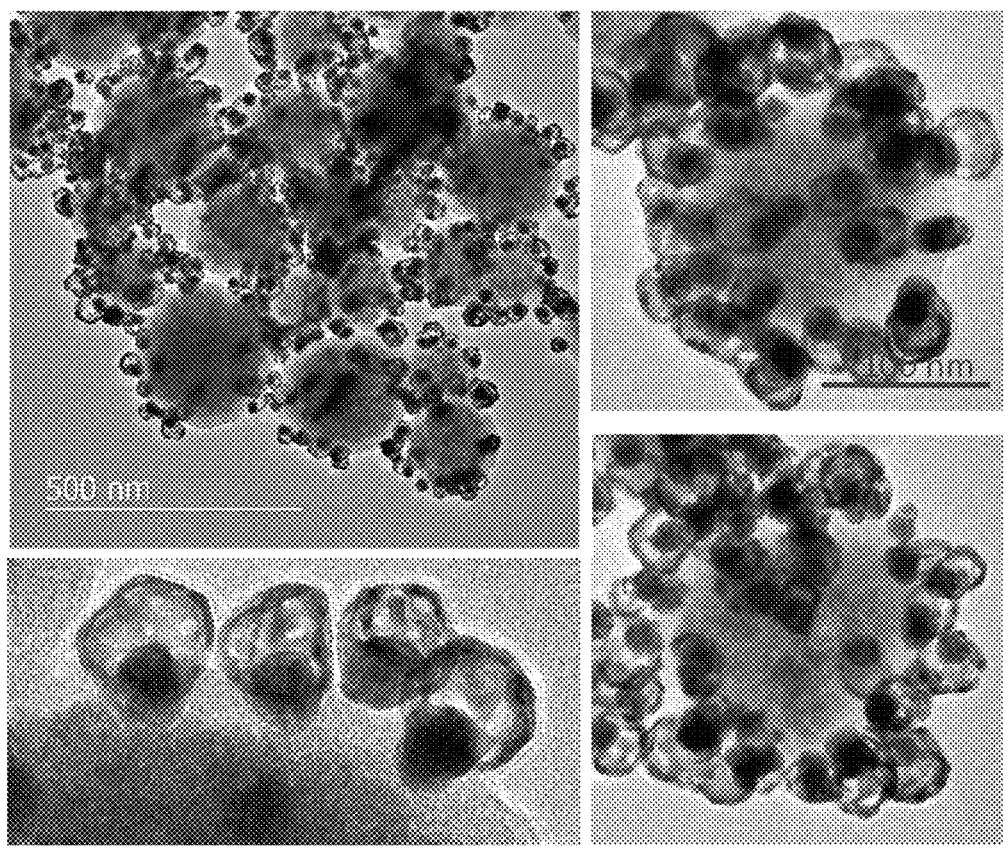
FIG. 23 illustrates TEM images of asymmetric nanostructures created through galvanic replacement between the Au—Ag hybrid nanoparticles shown in FIG. 22 and an aqueous solution of chloroauric acid ($HAuCl_4$) based on the scheme in FIG. 21.
Figure 24:
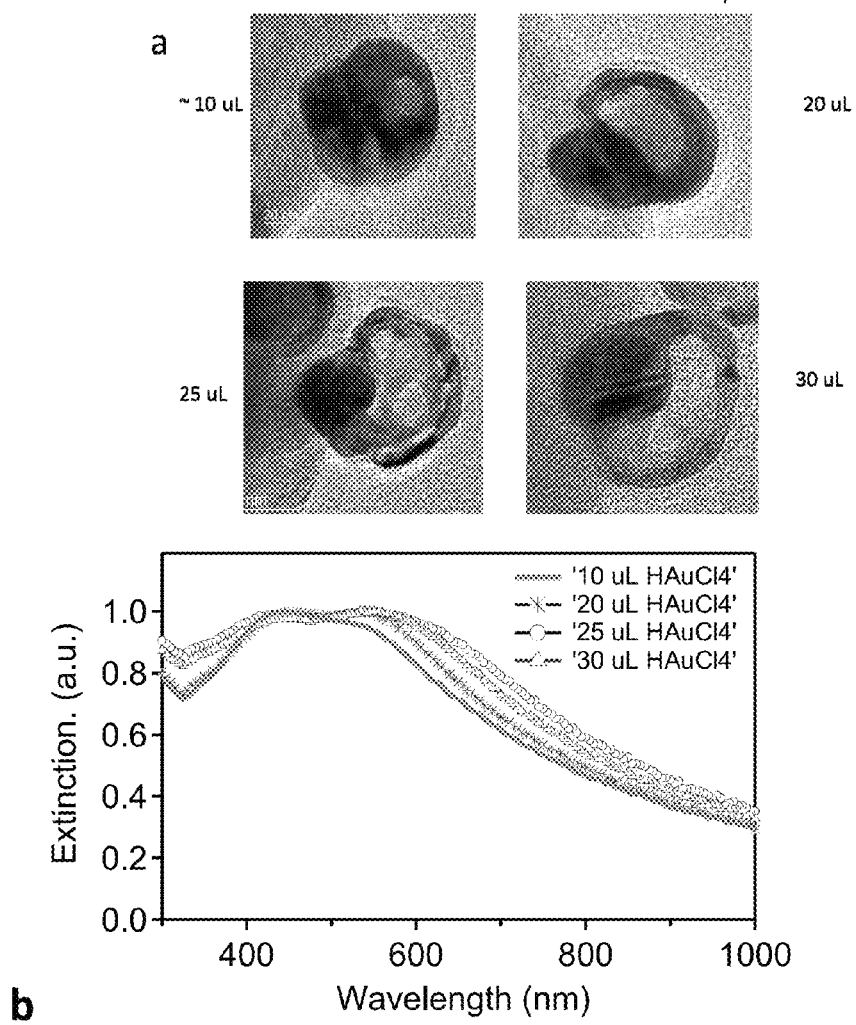
Figure 25:
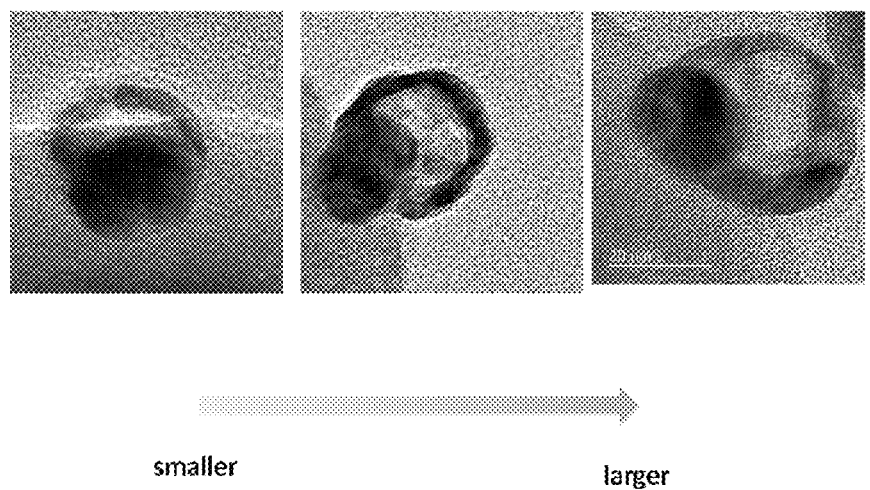
FIG. 25 illustrates representative TEM images of the control over the size of the hollow domains in the asymmetric Au nanoparticles by tuning the Ag domain during the seeded growth process of FIG. 21.
Figure 26:
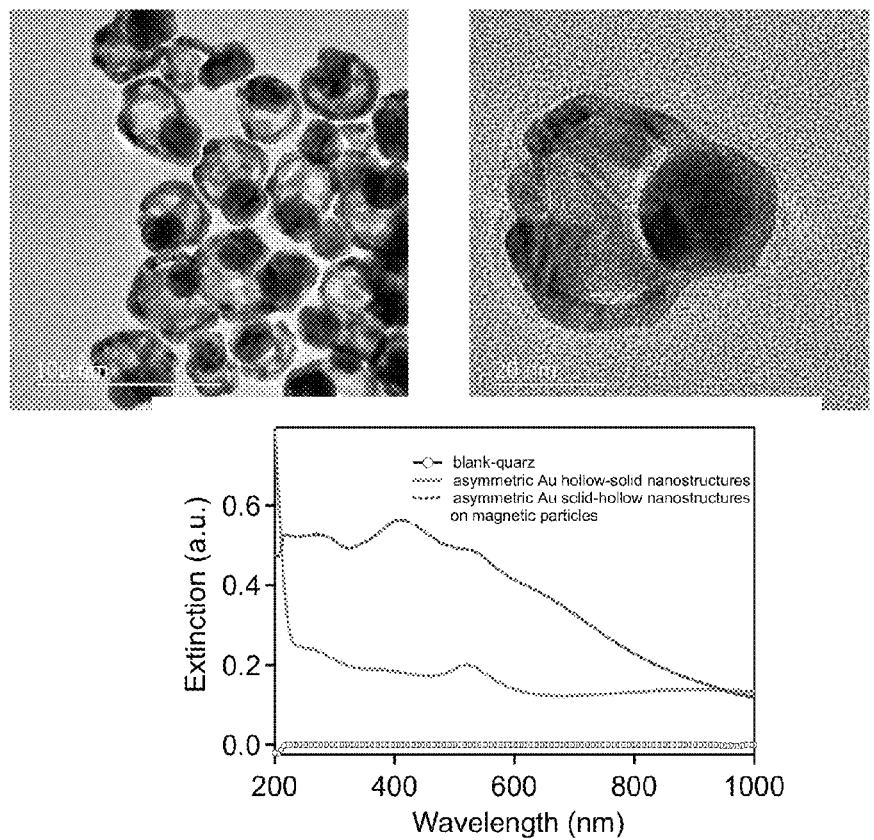
FIG. 26 illustrates the images of solid-hollow asymmetric Au nanoparticles together with the corresponding UV-vis-NIR spectra.
Figure 27:
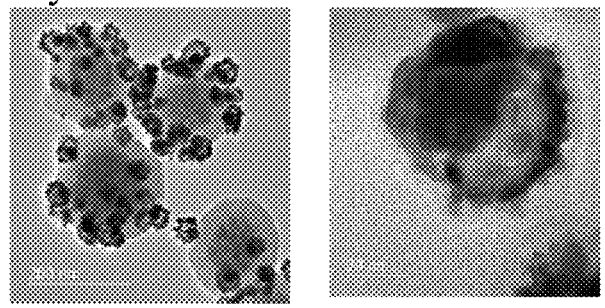
FIG. 27 shows the images of as-synthesized asymmetric Au—Pt solid-hollow nanostructures and Au—Pd solid-hollow nanostructures based on the similar procedures depicted in FIG. 21. The chemicals listed in the right column are used to react with the Au—Ag hybrid nanoparticles shown in FIG. 22 for the formation of solid-hollow asymmetric nanoparticles shown in the left columns.
Figure 27:
Figure 27:
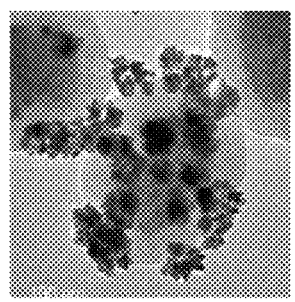
Figure 27:
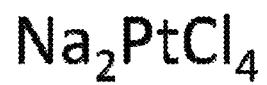
Figure 27:
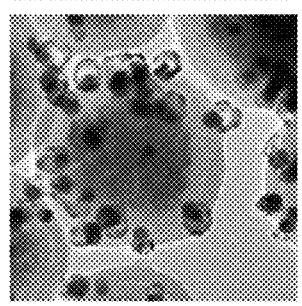
Figure 27:

FIG. 22 illustrates the formation of Au—Ag asymmetric nanoparticles through the procedure shown in FIG. 21. Before the release of Au—Ag nanoparticles from the mediation $SiO_2$ layer, the galvanic replacement between the Ag component and $HAuCl_4$ at boiling temperature can be applied to create more complicated nanostructures. The resulting asymmetric Au solid-hollow nanoparticles are demonstrated in FIG. 23. Control of the amount of HAuCl$_4$ can be used to control the morphology of the final product (FIG. 24). The asymmetric shapes of the solid-hollow Au nanoparticles can also be controlled by the original Ag domain size after the seeded growth (FIG. 25). FIG. 26 provides the final asymmetric solid-hollow Au nanoparticles after the dissolution of the mediation SiO$_2$ layer, in which the UV-vis-NIR spectra is also included. It should be appreciated that Au—Pt or Au—Pd asymmetric solid-hollow nanostructures may also be prepared with the similar procedures by using the appropriate precursors to galvanically react with the Ag domains in the Au—Ag nanoparticles shown in FIG. 22. FIG. 27 illustrates such an embodiment.

Figure 28:
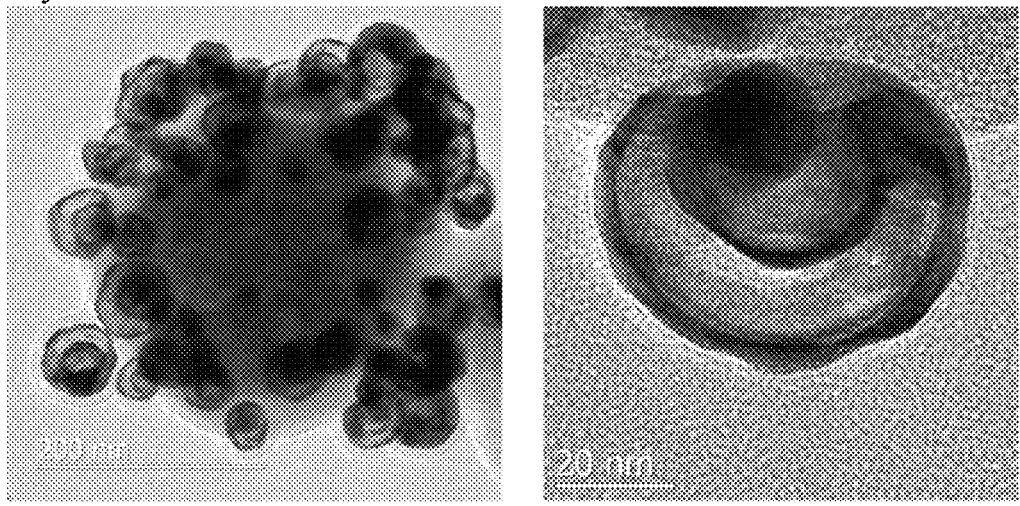
FIG. 28 shows the images of asymmetric Au solid-hollow nanostructures with double nanoshells through a similar approach in FIG. 21. An additional seeded growth of Ag and galvanic replacement are utilized after the Au solid-hollow nanoparticles shown in FIG. 26a are formed.

In a further embodiment, a double shelled asymmetric hollow nanoparticles may be fabricated by additional seeded growth and galvanic replacement. FIG. 28 illustrates the asymmetric nanoparticles with clear double shells.

Figure 29:
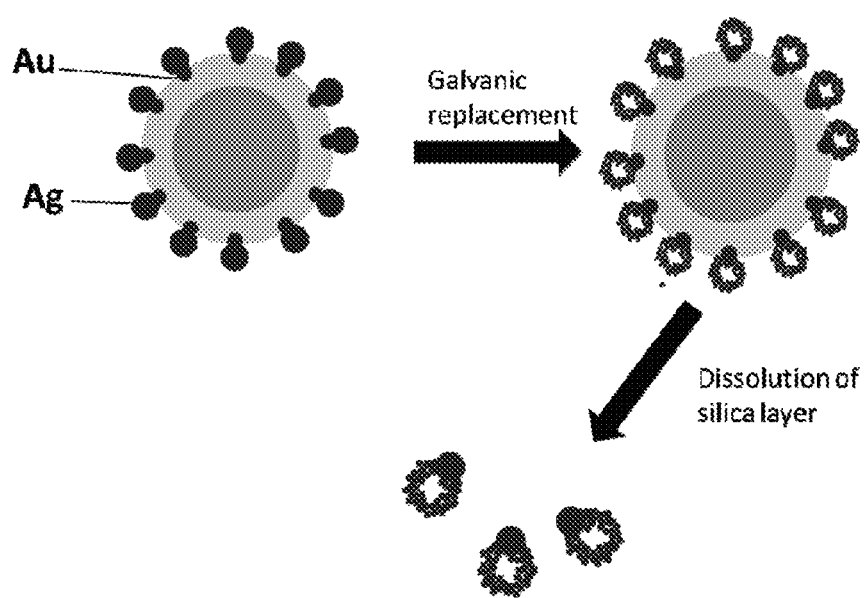
FIG. 29 illustrates the scheme of using the galvanic replacement in combination with $Fe_3O_4SiO_2$—Au—Ag nanoparticles to create nanoassemblies with more complex compositions.
Figure 30:
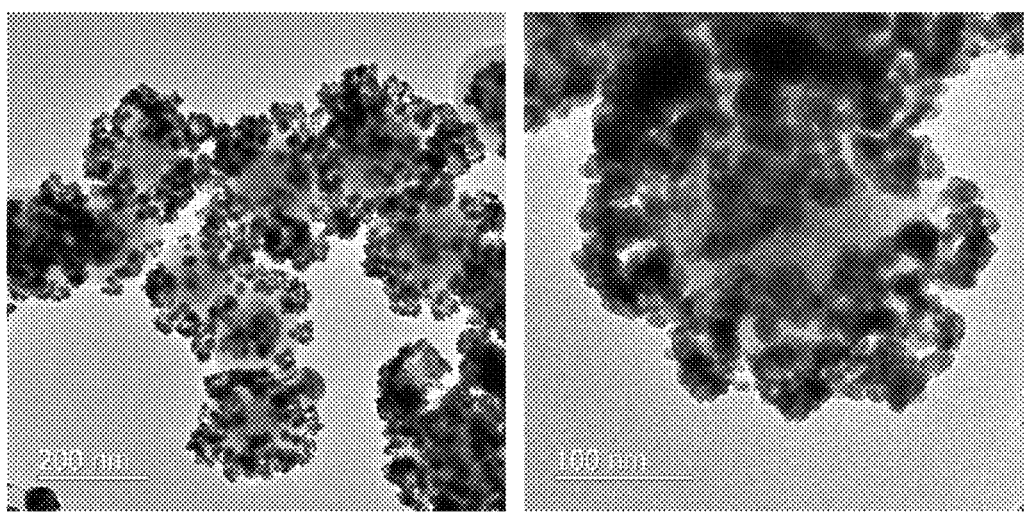
FIG. 30 illustrates the TEM images of a more complicated nanoparticle created following the procedure in FIG. 29 (symmetric Au nanoassemblies by rapid galvanic replacement at room temperature).

In a further embodiment, more complicated composite structures can be fabricated following the scheme shown in FIG. 29. In this process, galvanic replacement is taken at room temperature, which provides the opportunity for complicated asymmetric nanostructures. FIG. 30 illustrates the images of the final product followed by the procedure in FIG. 29.

Figure 31:
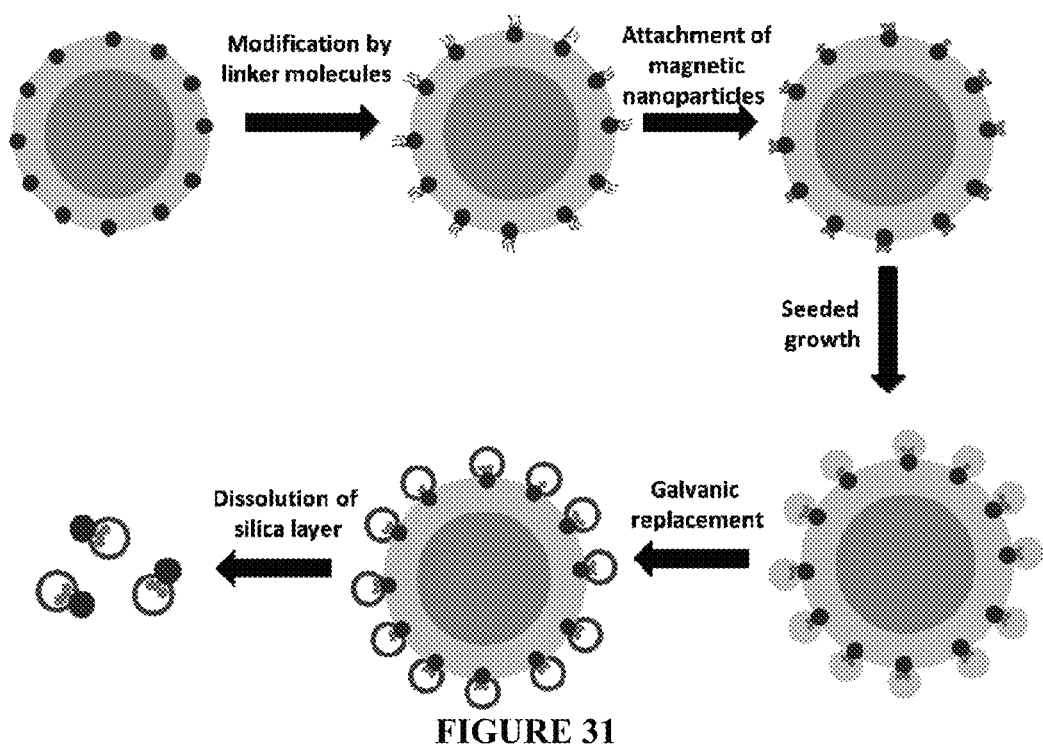
FIG. 31 illustrates procedures for fabricating magnetic asymmetric Au solid-hollow nanostructures.

One embodiment, schematically illustrated in FIG. 31, relates to procedures for fabricating magnetic asymmetric Au solid-hollow nanostructures. The core/shell particle described above is modified by linker molecules. Magnetic nanoparticles are then attached to the linker molecules. The resultant particle undergoes seed growth. Galvanic replacement the provides a hallow structure. Finally, dissolution of the silica layer frees the resultant assembled asymmetric magnetic noble metal hollow nanostructure.

Figure 32:
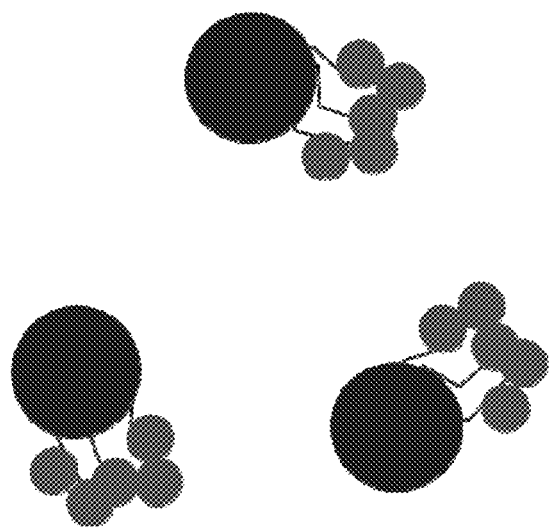
FIG. 32 illustrates the noble metal-quantum dots asymmetric assemblies fabricated following the procedures depicted in FIG. 7.

One embodiment, relates to procedures for fabricating noble metal-quantum dots asymmetric assemblies illustrated in FIG. 32 by following the procedures depicted in FIG. 7.

The resultant hybrid assembies may be utilized in a wide array of applications including medical imaging, therapy, and drug delivery. In some embodiments, such as those of FIGS. 31 and 32, the nanostructures are multifunctional.

EXAMPLES AND METHODS

Set forth below are non-limiting examples of certain embodiments of the present invention.

Chemicals. Ethanol (denatured), isopropanol (99.9%), ammonium hydroxide aqueous solution (28%), hexanes, tetrahydrofunan (THF), and sodium hydroxide (Certified, A.C.S. grade) were purchased from Fisher Scientific. 3-aminopropyl-triethoxysilane (APTS, 99%), potassium iodide (KI), and polyvinylpyrrolidone K12 (PVP, $M_w \approx 500$) were obtained from Acros Organics. Poly (acrylic acid) (PAA, $M_w \approx 1800$), tetraethyl orthosilicate (TEOS, 98%), hydrogen tetrachloroaurate (III) trihydrate (HAuCl$_4$.3H$_2$O, 99.9+%), sodium citrate tribasic dihydrate (99%), rhodamine 6G (R6G), cysteamine (~95%), 9-mercapto-1-nonanol, pentaerythritol tetrakis(2-mercaptoacetate) and $_L$-ascorbic acid were obtained from Sigma-Aldrich. Polyvinylpyrrolidone K15 (PVP, $M_w \approx 10\,000$) was purchased from Fluka. All chemicals were used as received without further purification and treatment.

Synthesis of Fe$_3$O$_4$—SiO$_2$ Core-Shell Particles Decorated with Au Seeds.

Fe$_3$O$_4$ nanoparticles were synthesized via a high-temperature hydrolysis reaction reported previously (Angew. Chem. Int. Ed. 2007, 46, 4342). It was accomplished through the hydrolysis and reduction of FeCl$_3$ in diethylene glycol (DEG) under a basic environment (adjusted with NaOH). PAA was used as surface capping molecules to stabilize the Fe$_3$O$_4$ nanoparticles. The as-synthesized Fe$_3$O$_4$ nanoparticles were then coated with silica (SiO$_2$) shells through a modified Stöber process. Typically, 20 mL of ethanol was first added to 3 mL of aqueous solution containing Fe$_3$O$_4$ nanoparticles (~23 mg). Addition of 1 mL of ammonium hydroxide aqueous solution (28%) to the nanoparticle solution adjusted the pH value of the solution. Injection of 0.1 mL of TEOS to the nanoparticle solution initiated the deposition of silica shells on the surfaces of the Fe$_3$O$_4$ nanoparticles. Mechanical stirring and room temperature were maintained throughout the whole process. Thickness of the resulting silica shells was determined by the reaction time. For example, the particles shown FIG. 12b were synthesized after the reaction lasted 20 minutes. The Fe$_3$O$_4$—SiO$_2$ core-shell particles were then washed with ethanol for two times. Next, the resulting core-shell particles were re-dispersed in 20 mL of isopropanol containing 50 µL of APTS. Incubating the particles at 80° C. for 2 hours modified the outer surfaces of the silica shells with amino groups. The modified particles were then washed with isopropanol twice and re-dispersed in 3 mL of deionized (DI) water. Finally, mixing 1.5 mL of the modified core-shell particles with 20 mL aqueous dispersion of citrate stabilized Au nanoparticles (J. Phys. Chem. B, 2006, 110, 15700) under strong sonication led to the adsorption of Au nanoparticles on the Fe$_3$O$_4$—SiO$_2$ core-shell particles. The average size of Au nanoparticles is ~15 nm with a concentration of $4.8 \times 10^{-4}$ M based on elemental Au. The density of Au nanoparticles was dependent on the volume of Au nanoparticle solution added. For instance, the sample shown in FIG. 12c was obtained after the adsorption with 15 mL Au nanoparticle solution. The Fe$_3$O$_4$—SiO$_2$ core-shell particles decorated with Au seeds were separated and re-disperse in 1 mL of DI water. Later, 1 mL of the dispersion of composite particles of Fe$_3$O$_4$—SiO$_2$ core-shell particles decorated with Au seeds was mixed with an aqueous solution of PVP K15 (20 mL, 0.02 g/mL) under sonication. These particles were then separated with an external magnetic field and rinsed with DI water to get rid of the extra PVP molecules in the solution. The particles were then re-dispersed with a solution containing ethanol (20 mL), DI water (3 mL), and ammonium hydroxide aqueous solution (1 mL, 28%). Injection of TEOS (30 µL) to the dispersion resulted in the growth of a second thin silica layer only on the original SiO$_2$ surface but not on the Au nanoparticles. By adjusting the concentration of TEOS and/or reaction time, different ratios of the Au nanoparticle surfaces can be exposed.

Figure 4:
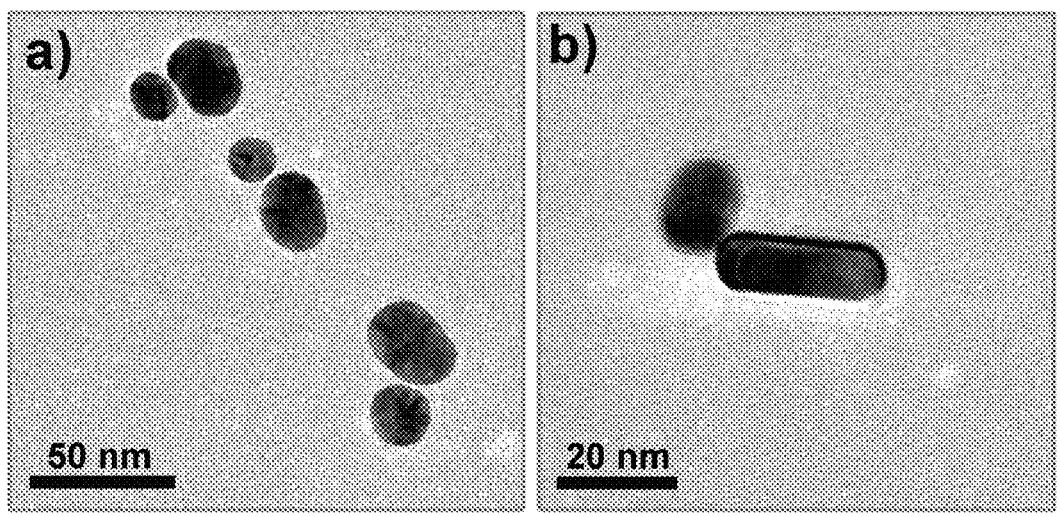

Au dimers. Au nanoparticles with different sizes can be used for the fabrication of Au dimers. First, Fe$_3$O$_4$—SiO$_2$—Au—SiO$_2$ composite particles with the very top of Au surface exposed were chosen as the starting materials. Typically, cysteamine (0.05 mL, 0.06 g/mL) was selected as the linker and grafted onto the exposed Au surface by incubation with Fe$_3$O$_4$—SiO$_2$—Au—SiO$_2$ composite particles (0.5 mL) at room temperature for 40 minutes. Secondly, the modified composite particles were purified by magnet and washed with DI H$_2$O three times to get rid of extra cysteamine molecules in the solution. The resulting composite particles were re-dispersed in 1 mL DI H$_2$O. Addition of Au nanoparticles solution (2 mL, ~15 nm) was followed and vortexed for 10 minutes. The mixture was incubated for another 1 hour to ensure the attachment of free Au nanoparticles onto the cysteamine modified Au surface. The final Fe$_3$O$_4$—SiO$_2$—Au—SiO$_2$—Au nanostructures were separated by magnet, washed with DI H$_2$O twice and re-dispersed in aqueous NaOH solution (4 mL, 0.05 g/mL). The silica layer was etched by NaOH in one hour and Fe$_3$O$_4$ cores were separated by magnet, leading to the collection of freestanding Au dimers, Larger Au (L Au) nanoparticles (~30 nm) can be used as another component nanoparticles to fabricate Au-L Au asymmetric dimers. Besides, Au nanoparticle-Au nanorod asymmetric dimers can be produced by utilizing Au nanorods as the assemble building blocks. FIG. 4 illustrates representative TEM images of asymmetric heterodimers made of (a) Au nanoparticles with different diameters (i.e., 15 nm and 30 nm) and (b) Au nanoparticles with different morphologies (i.e., spheres and rods).

Au Asymmetric Nanoclusters.

The basic strategy follows the synthesis of Au dimers except that Au nanoparticles were confined with different exposure ratio on Fe$_3$O$_4$—SiO$_2$ colloidal substrates and small Au nanoparticles (~3 nm) were used as another component. Typically, after Fe$_3$O$_4$—SiO$_2$—Au—SiO$_2$ particles were modified with abundant amino groups on the exposed Au surface, an additional Au nanoparticles solution (2 mL, ~3 nm) was mixed under sonication and incubated for 1 hour. Then the Fe$_3$O$_4$—SiO$_2$—Au—SiO$_2$—Au composite particles were separated by magnet, washed with DI H$_2$O twice and re-dispersed in aqueous NaOH solution (4 mL, 0.05 g/mL) to remove the silica layer. Au asymmetric nanoclusters were finally collected after the Fe$_3$O$_4$ cores were separated by magnet. FIGS. 6*a-f* present the representative TEM images of nanoassemblies of Au nanoparticles with controlled asymmetries. From FIG. 6(*a*) to (*f*), the portion of the exposed surfaces of the Au nanoparticles (~15 nm in size) increases, leading to more Au nanoparticles with smaller sizes (e.g., ~3 nm) to be attached to each Au nanoparticle to form core-satellite nanoassemblies with different asymmetries.

Synthesis of Au—Ag Dimers.

Figure 5:
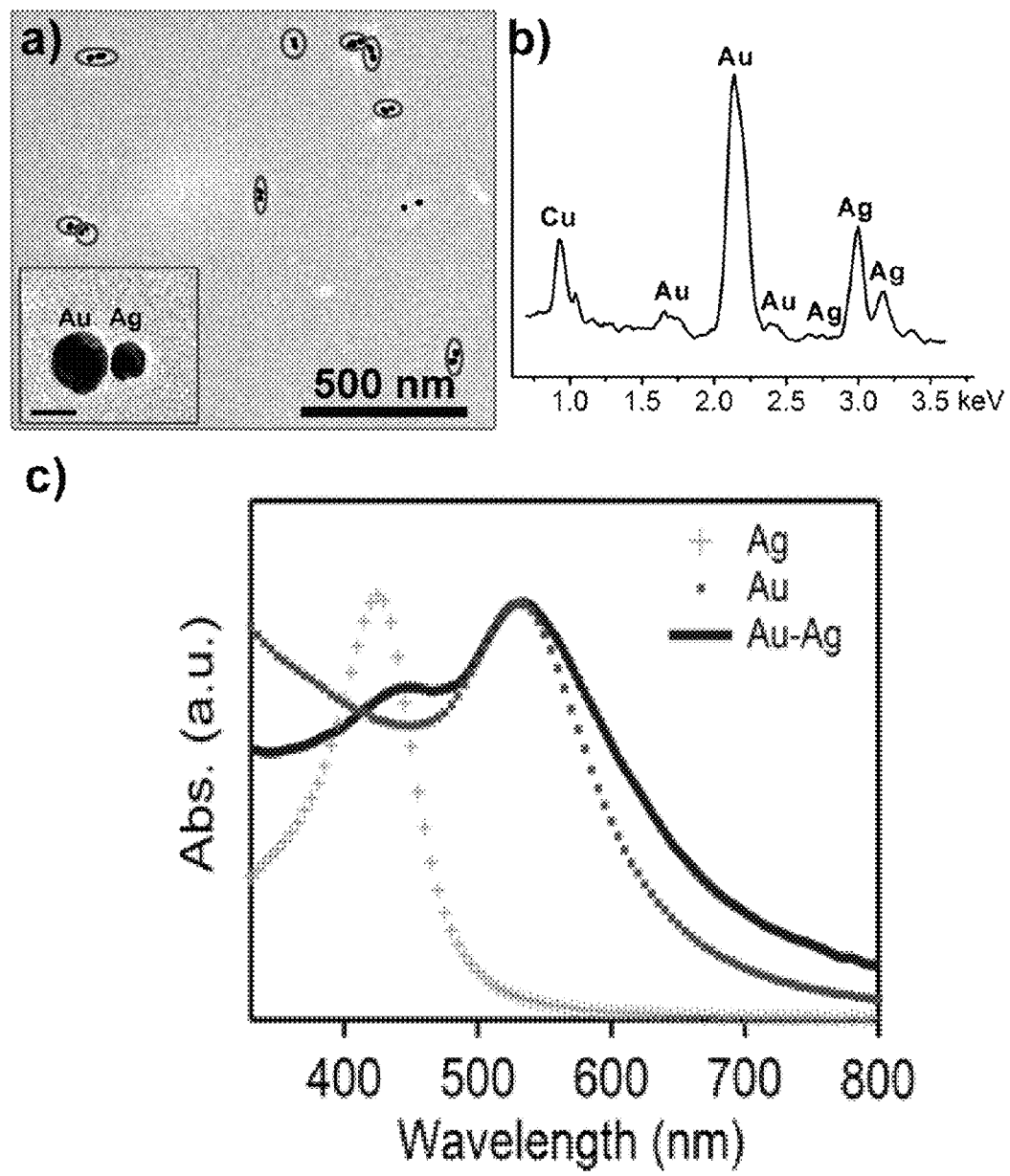
FIGS. 5a-c presents the characterization results of the freestanding heterodimers made of 15-nm Au nanoparticles and 8-nm silver (Ag) nanoparticles.

The process was slightly different to the fabrication of Au dimmers. Pentaerythritol tetrakis(2-mercaptoacetate) was chosen as the linker molecule to bridge the exposed Au surface on colloidal substrates to free Ag nanoparticles in the solution. Typically, pentaerythritol tetrakis(2-mercaptoacetate) (0.02 mL) dissolve in THF (1 mL) was incubated with Fe$_3$O$_4$—SiO$_2$—Au—SiO$_2$ solution (0.5 mL) at room temperature for 40 minutes. Then extra pentaerythritol tetrakis (2-mercaptoacetate) molecules were removed by magnetic separation, washed with THF and DI H$_2$O three times. The resulting particles were re-dispersed in 1 mL DI H$_2$O. Next, additional Ag aqueous solution (2 mL, 0.2 mM) was added under sonication and the mixture was incubated for another 1 hour to ensure the attachment of free Ag nanoparticles onto the thiol-grafted Au surface. The product were purified by magnetic separation, washed with DI H$_2$O twice and re-dispersed in aqueous NaOH solution (4 mL, 0.05 g/mL). Finally, the silica layers in the composite structures were etched by NaOH and the Fe$_3$O$_4$ cores were removed by a magnet, leaving Au—Ag dimers in the solution. FIG. 5 presents the characterization results of the freestanding heterodimers made of 15-nm Au nanoparticles and 8-nm silver (Ag) nanoparticles. FIG. 5(*a*) is a representative TEM image of the Au—Ag dimers highlighted with the ellipses. The inset highlights an individual Au—Ag dimer and the scale bar is 15 nm. FIG. 5(*b*) shows the corresponding energy-dispersive x-ray scattering spectroscopy (EDS) curve of individual Au—Ag dimer, clearly displaying the appearance of both characteristic peaks of Au and Ag. FIG. 5(*c*) compares the UV-vis-NIR spectra of the Au—Ag dimers, the Au NPs, and the Ag NPs.

Synthesis of Amphiphilic Asymmetric Nanostructures.

Figure 8:
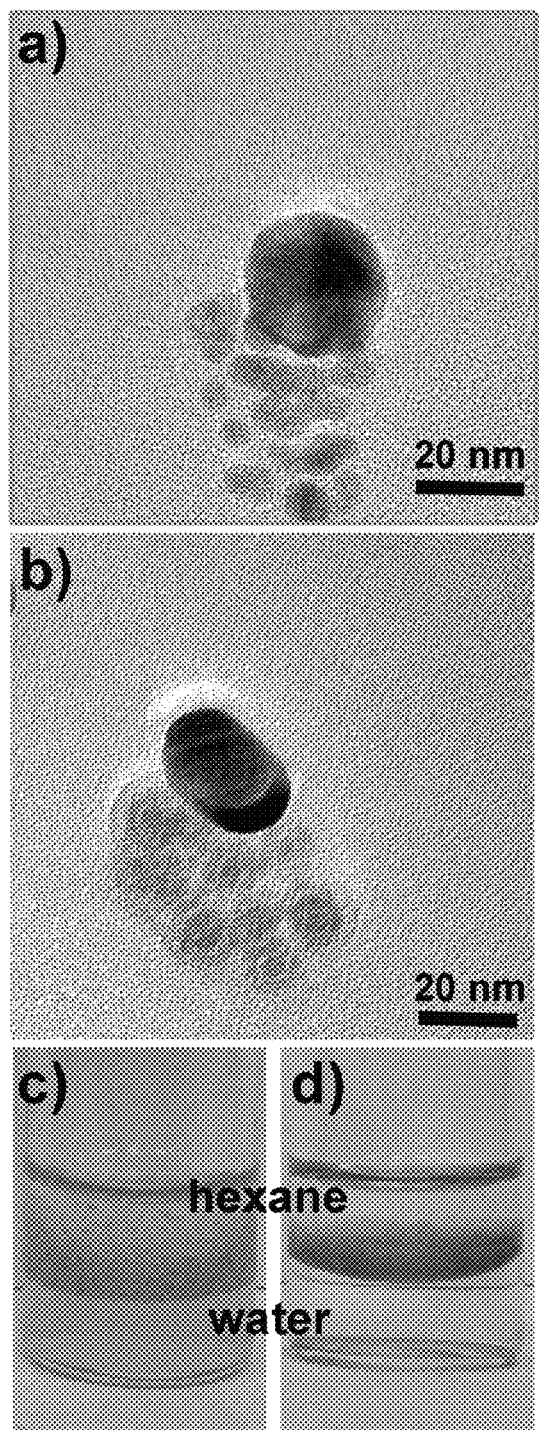
FIGS. 8a-d demonstrates representative TEM images of amphiphilic asymmetric nanostructures assembled according to the process shown FIG. 7.

In this modified fabrication strategy, the exposed surfaces of Au nanoparticles were first grafted with hydrophobic thiolated molecules and then allow hydrophobic nanoparticles to assemble on the surface. Typically, aqueous Au anchored colloidal substrates (0.5 mL) was first transferred to THF (0.5 mL). Then 9-mercapto-1-nonanol molecules (0.05 mL) were allowed to conjugate on the exposed surface of Au nanoparticles after incubation for 40 minutes. The resulting composite particles were separated by magnet, washed with THF three times and re-dispersed in THF (0.5 mL). Later, hydrophobic nanoparticles (component B, scheme 1) dissolved in hexane (such as Fe—Fe$_3$O$_4$ core-shell nanoparticles or Au nanoparticles (0.02 mL)) were added into the THF solution under strong sonication. The mixture were dried by air and washed with THF three times. Finally, the composite particles were dispersed in aqueous NaOH solution (4 mL, 0.05 g/mL) to remove the silica layer, leaving amphiphilic asymmetric nanostructures in solution. FIG. 8 demonstrates representative TEM images of amphiphilic asymmetric nanostructures assembled according to the process shown FIG. 7.

Synthesis of MRMGPs.

First, the Fe$_3$O$_4$—SiO$_2$ core-shell particles decorated with Au seeds was coated with a second SiO$_2$ layer through a modified Stöber method. Next, the Au seeds on the particles facilitated an electroless seed-mediated plating process to grow the Au seeds to form larger Au nanoparticles. In a typical plating reaction, 4 mL of DI water, 400 µL of aqueous PVP K12 solution (with a concentration of 5% in weight), 400 µL of aqueous KI solution (0.2 M), 400 µL of aqueous ascorbic acid solution (0.1 M), and 30 µL of aqueous HAuCl4 solution (0.1 g/mL) were sequentially added to a 20 mL vial under continuous magnetic stirring to form the plating solution. To the plating solution, 150 µL of the previously prepared particles with Au seeds was injected into the plating solution to trigger an immediate growth of the Au seeds, accompanied by a significant color change from colorless to brick red, boysenberry, then blue-purple, and finally dark electric blue. After 10 min of plating reaction, MRMGPs were separated from the plating solution with the assistance of an external magnetic field and washed with water. FIG. 12 presents TEM and SEM images of the products formed during the synthesis of MRMGPs.

Characterization.

A JEOL 2010F(s) transmission electron microscope was used to characterize the morphology and interfaces of the hybrid particles formed in each step. The as-synthesized particles were dispersed in ethanol to form dispersions at appropriate concentrations. To prepare a TEM sample, a drop of particle dispersion was delivered to a carbon-coated copper grid with the use of pipette, followed by evaporation of solvent in a fume hood at room temperature. The TEM images were obtained at 200 kV operation voltage. A JSM JEOL 7500F field-emission scanning electron microscope operated at 10 kV under high-vacuum mode was used to record the SEM images. A VARIAN CARY-50 UV-Vis-NIR spectrophotometer was used to record the UV-Vis-NIR spectra of the particle dispersions.

SERS Measurements.

Samples for SERS evaluation were prepared by adding the as synthesized particles to aqueous solutions of R6G with different concentrations. The mixtures were incubated for 12 h at room temperature to allow the adsorption of R6G cations to the surfaces of Au nanoparticles. The samples were then transferred to glass sides with concave wells [Fisherbrand, #12-565A] for spectral characterization. Raman spectra were collected from solutions using a Renishaw in via confocal Raman spectrophotometer coupled to a Leica microscope with a 50× objective in backscattering configuration. The Raman signals were excited with a 785-nm laser and the excitation solution volume was ~50 µL. The sample cell was constructed by laminating a glass cover slide (0.1-0.13 mm in thickness) on a glass slide with concave well that was filled with solutions. The scattering spectra were recorded in the range of 500-1800 cm−1. 10 s of the acquisition time was used for one spectrum. Processing of the Raman spectra and data analysis was carried out with IGOR Pro software (Portland, Oreg.).

Calculation of Enhancement Factor (EF).

The SERS peak at 611 cm$^{-1}$ was used to estimate the EF of the MRMGPs with the following equation: $EF=(I_{sers} \times N_{bulk})/(I_{bulk} \times N_{sers})$, where $I_{sers}$ and $I_{bulk}$ were the intensities of the same band for the SERS and bulk spectra, $N_{sers}$ was the number of bulk molecules probed for a bulk sample and $N_{sers}$ was the number of molecules probed in the SERS spectrum. All spectra are normalized against integration time. $N_{bulk}$ was determined based on the Raman spectrum of a 1 mM R6G solution (solid curve, FIG. 18). When determining $N_{sers}$, it was assumed that the addition of MRMGPs to a R6G solution did not change the uniform distribution of R6G in the solution. For instance, the EF for MRMGPs without the magnetic concentration that can be estimated from the analysis of FIG. 18 (open circles) was approximately $0.91 \times 10^5$.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of making asymmetric nanostructures with the use of a colloidal magnetic particle as a reactor, comprising:
   providing a superparamagnetic core;
   coating the magnetic core with a shell layer;
   associating a plurality of a first component with the coated magnetic core;
   adding a mediation layer, the thickness of the mediation layer being less than the diameter of at least a subset the plurality of first component, each first component in the subset having an exposed portion outside of the mediation layer;
   modifying each exposed portion;
   removing the shell layer and mediation layer; and
   forming the asymmetric nanostructures, which comprise the first component and a second component.

2. The method of claim 1, wherein the modifying each first component comprises modifying the exposed portion with a molecule that can specifically bind with the second component.

3. The method of claim 1, wherein the modifying each first component comprises overgrowing the exposed portion to enlarge each first component in the subset.

4. The method of claim 1, wherein the mediation layer is amorphous $SiO_2$ with a controlled thickness, such that the modified core comprises a $Fe_3O_4$—$SiO_2$ particle formed by a modified Stöber reaction associated with the hydrolysis of tetraethylorthosilicate (TEOS) to coat the $Fe_3O_4$ particles with the amorphous $SiO_2$ layer.

5. The method of claim 4, further comprising modifying the modified core $Fe_3O_4$—$SiO_2$ core-shell particles with 3-aminoproplytriethoxysilane (APTS) in an isopropanol solution to graft the $SiO_2$ surface with amino groups (—$NH_2$).

6. The method of claim 1, wherein the plurality of the first component comprise Au nanoparticles and further wherein the associating of the plurality of the first component comprises bonding.

7. The method of claim 1, wherein the shell layer and the mediation layer both comprise $SiO_2$.

8. The method of claim 1, wherein the modifying each first component of the subset comprises overgrowth through electroless plating.

9. The method of claim 1, wherein the first component and the second component consist of the same material.

10. The method of claim 1, wherein the first component and the second component consist of different materials.

11. The method of claim 1, further comprising isolating the core/shell layer/mediation layer/first component particle with a magnetic field prior to modification with the second component.

12. The method of claim 1, wherein the first component and the second component have different sizes.

13. The method of claim 1, wherein the mediation layer thickness is between 0% and 99% of each first component in the subset.

14. A method of synthesizing nanostructures comprising:
   depositing a first $SiO_2$ layer on a magnetic core particle;
   attaching a first component to the first $SiO_2$ layer;
   depositing a second $SiO_2$ layer, the second $SiO_2$ layer having a thickness less than the diameter of the first component and the first component partially embedded in the second $SiO_2$ layer;
   attaching a second component to the first component;
   wherein the each of the nanostructures comprise the first component and the second component.

15. The method of claim 14, wherein prior to attaching a second component, the first component is modified with a linker which can specifically bind with the second component.

16. The method of claim 14, wherein the second component is attached by plating on exposed portion of the first component.

17. The method of claim 14, wherein the second $SiO_2$ layer is amorphous, such that the modified core comprises a $Fe_3O_4$—$SiO_2$ particle formed by a modified Stöber reaction associated with the hydrolysis of tetraethylorthosilicate (TEOS) to coat the $Fe_3O_4$ particles with the amorphous $SiO_2$ layer.

18. The method of claim 14, wherein the plurality of the first component comprise Au nanoparticles.

19. The method of claim 14, wherein the first component and the second component consist of the same material.

20. The method of claim 14, wherein the first component and the second component consist of different materials.

* * * * *